(12) United States Patent
Kodama et al.

(10) Patent No.: US 9,823,988 B2
(45) Date of Patent: Nov. 21, 2017

(54) SYSTEM AND METHOD OF TEST ITERATION VIA PROPERTY CHAINING

(71) Applicant: Spirent Communications, Inc., Sunnyvale, CA (US)

(72) Inventors: Greg Kodama, Honolulu, HI (US); Kahou Lei, Sherman Oaks, CA (US); Gwo-Jieh Wang, Cary, NC (US); Barry Andrews, Holly Springs, NC (US); Caden Jon Y. Morikuni, Kaneohe, HI (US); Brian Castelli, Fuquay-Varina, NC (US); Rahul Patel, La Palma, CA (US); Nicholas Peters, Ottawa (CA)

(73) Assignee: SPIRENT COMMUNICATIONS, INC., Sunnyvale, CA (US)

( * ) Notice: Subject to any disclaimer, the term of this patent is extended or adjusted under 35 U.S.C. 154(b) by 43 days.

(21) Appl. No.: 14/856,452

(22) Filed: Sep. 16, 2015

(65) Prior Publication Data

US 2016/0080243 A1   Mar. 17, 2016

Related U.S. Application Data

(60) Provisional application No. 62/051,175, filed on Sep. 16, 2014, provisional application No. 62/051,204, (Continued)

(51) Int. Cl.
| | |
|---|---|
| *H04L 12/26* | (2006.01) |
| *G06F 11/263* | (2006.01) |
| *G06F 11/26* | (2006.01) |
| *G06F 11/36* | (2006.01) |
| *H04L 12/24* | (2006.01) |

(52) U.S. Cl.
CPC .......... *G06F 11/263* (2013.01); *G06F 11/261* (2013.01); *G06F 11/3684* (2013.01); *H04L 41/0806* (2013.01); *H04L 43/0888* (2013.01); *H04L 43/16* (2013.01); *H04L 43/50* (2013.01); *H04L 41/0879* (2013.01)

(58) Field of Classification Search
CPC ..... H04L 41/0806; H04L 43/50; H04L 43/16; H04L 43/0888; H04L 41/0879; G06F 11/263
See application file for complete search history.

(56) References Cited

U.S. PATENT DOCUMENTS

| | | | |
|---|---|---|---|
| 7,423,287 B1 * | 9/2008 | U'Ren | B81C 99/005 257/48 |
| 2007/0056380 A1 * | 3/2007 | Chan | G01R 31/2648 73/775 |

(Continued)

OTHER PUBLICATIONS

Spirent, "Spirent Journal of Layer ⅔QoS PASS Test Methodologies," Spirent Communications 2011, pp. 1-57.

(Continued)

*Primary Examiner* — Brian D Nguyen
(74) *Attorney, Agent, or Firm* — Haynes Beffel & Wolfeld LLP; Ernest J. Beffel, Jr.

(57) ABSTRACT

A new test control structure improves on constructing complex test sequences in a scripting language. The new test control structure iterates over two or more arbitrary values of a test attribute, such as a networking protocol parameter applied at OSI layers 2-7.

17 Claims, 16 Drawing Sheets

Related U.S. Application Data filed on Sep. 16, 2014, provisional application No. 62/051,215, filed on Sep. 16, 2014.

(56) References Cited

U.S. PATENT DOCUMENTS

| | | | | |
|---|---|---|---|---|
| 2013/0328582 | A1* | 12/2013 | Han | H01Q 9/0442 |
| | | | | 324/750.02 |
| 2014/0019560 | A1* | 1/2014 | Li | H04L 43/50 |
| | | | | 709/206 |
| 2014/0302797 | A1* | 10/2014 | Han | H04W 24/06 |
| | | | | 455/67.14 |

OTHER PUBLICATIONS

McKeown, et al., "OpenFlow: Enabling Innovation in Campus Networks," ACM SIGCOMM Computer Communication Review, Apr. 2, 2008, vol. 38, No. 2, 6 pages.

"Modern OpenFlow and SDN—Part 1,"Big Switch Networks, Inc, 2015, <http://bigswitch.com/blog/2014/05/02/modern-openflow-and-sdn-part-i> retrieved Aug. 7, 2014, 3 pages.

Ferro, Greg, "Explaining L2 Multipath in terms of North/South, East West Bandwidth," Greg Ferro 2008-2015, <http://etherealmind.com/layer-2-multipath-east-west-bandwidth-switch-designs/> retrieved Aug. 7, 2014, 6 pages.

* cited by examiner

⋮

```
<ExposedProperty id="3091"
EPNameId="spirent.methodology.createtemplateconfigcommand.copies
perparent.2995" EPPropertyName=""
EPClassId="spirent.methodology.createtemplateconfigcommand"
EPPropertyId="spirent.methodology.createtemplateconfigcommand.copi
esperparent" EPDefaultValue="1" EPLabel="" Active="TRUE"
LocalActive="TRUE"              ⌐673a
Name="spirent.methodology.createtemplateconfigcommand.copiesperpa
rent.2995">
<Relation type="ScriptableExposedProperty" target="2995"/>
</ExposedProperty>
```
672

```
Number of IGMP/MLD hosts per host port:
    {
      "display_name":
"spirent.methodology.createtemplateconfigcommand.copiesperparent",
      "description": "",
      "gui_id": "",
      "property_value_type": "integer",
      "property_value": "4000",
      "prop_id":         ⌐675
"spirent.methodology.createtemplateconfigcommand.copiesperparent.29
95"
    },
```
674

FIG. 6C

SYSTEM AND METHOD OF TEST ITERATION VIA PROPERTY CHAINING

PRIORITY CLAIM

This application claims the benefit of three provisional applications filed on Sep. 16, 2014. The priority applications are: "SYSTEMS AND METHODS OF BUILDING SEQUENCEABLE TEST METHODOLOGIES," by Greg Kodama, Kahou Lei, Gwo-Jieh Wang, and Brian Castelli, U.S. Prov. App. No. 62/051,175; SYSTEM AND METHOD OF TEST VALIDATION USING COMMAND INHERITANCE by Greg Kodama, Kahou Lei, Gwo-Jieh Wang, and Brian Castelli, U.S. Prov. App. No. 62/051,204; and SYSTEM AND METHOD OF TEST ITERATION VIA PROPERTY CHAINING by Greg Kodama, Kahou Lei, Gwo-Jieh Wang, Barry Andrews, Caden Morikuni, Brian Castelli, Rahul Patel, and Nick Peters, U.S. Prov. App. No. 62/051, 215. These priority applications are incorporated herein by reference in their entirety.

BACKGROUND

Digital video transmission and big data each have increased data load on information technology systems by orders of magnitude. More installations are processing large data volumes than before. This increases the number of ordinary IT professionals involved in core network testing.

Core network testing of this sort has been a specialized skill possessed by a handful of testing companies and a cadre of testing professionals. As the need for core network testing expands, an opportunity arises to simplify configuration and customization of test protocols. New test configuration architectures can make sophisticated tests accessible to ordinary IT professionals, without need to call in the best and brightest leaders in the test industry to set up an onsite test.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claims.

SUMMARY

The technology disclosed allows for the creation and management of end user modifiable topologies and test modules. The techniques that enable end user modification of these topologies and test modules can be used to control access by end users to which test parameters can be modified, thereby providing for a safe, yet flexible test vehicle.

The technology disclosed allows the concept of inheritance to be applied to groups of testing commands and automated validation. The metadata of the group is inherited by the group's members, and is available to all other groups within the command sequence. This simplifies the validation of script groupings by allowing the automated validation of command and command group membership in the test methodology. It overcomes problems with naïve inheritance related to inconsistent test environment scripting choices.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 6B illustrates excerpts from a test XML implementation of test parameter data and exposed test parameters.

FIG. 6C illustrates excerpts from a JSON implementation of test parameter data and exposed test parameters.

DETAILED DESCRIPTION

Figure 1:
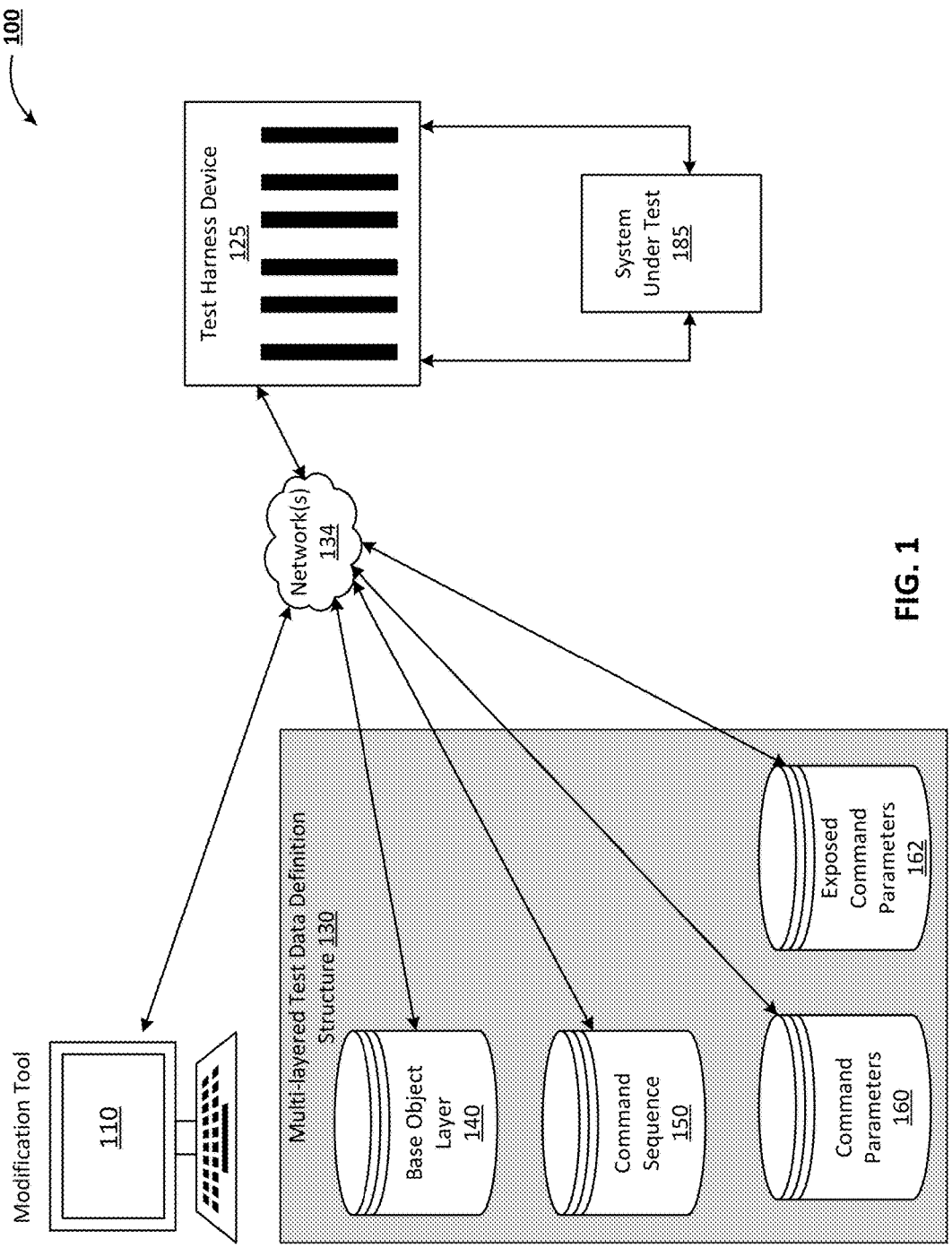
FIG. 1 illustrates a system environment in which the technology disclosed is useful.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The technology disclosed configures a test harness to conduct a network test. A test harness is a flexible, highly configurable device with specialized capabilities used to implement network tests. A test harness is difficulty to program for its specialized test purposes, because it offers so many options. A single device or group of devices configured to work together as a test harness simulates thousands or even millions of network sessions or flows between opposing endpoints. Sometimes a third endpoint is simulated by a test harness to exercise a separate control plane of messages. Sometimes a single endpoint is used to implement single armed testing such as session rate or capacity tests without traffic or loopback traffic tests. Given the range of tests that a test harness can be configured to conduct, the ordinary IT professional will find the learning curve too steep and the investment too high to author tests for their site.

In a controlled environment such as a test lab, a single device or tightly clustered group of devices implement a test, reducing synchronization issues among ports used to carry traffic. A high capacity device includes a chassis with as many as a dozen processor cards. Some high test capacity processor cards include FPGAs with high speed SRAM and other precision components. Multiple chasses can be linked to perform commands when the test scenario calls for particularly high traffic volumes. A lower capacity device also can be used as a test harness, with specially programmed processors and network interfaces that leverage low cost hardware. Even when low cost hardware is used, a test harness is a special purpose testing system.

In some environments, multiple devices may be used, synchronized, for instance, using GPS time signals to coordinate signal transmission and timing measurements across a wide area network or a complex of buildings. Spirents TestCenter Live 7500 Series Probe™ is an example of a secondary device used to form a test harness.

Technology disclosed includes a multi-layer test definition data structure (MLTDDS) with multiple levels of parameter encapsulation. Base templates implement devices, stacks and protocols simulated at opposing endpoints. One set of configuration commands establish counts and characteristics of the opposing endpoints, sometimes called the network topology. Network messaging components are simulated, in the sense that one hardware platform can generate sessions or flows with thousands or even millions of IP addresses, MAC addresses, and other session identifiers or characteristics.

Another set of commands specify traffic mix to be used during a test. That is, types, sizes, timing and other characteristics of the sessions or flows.

During a test, a test sequence issues commands to the test harness. Some of the commands send control messages to the system under test (SUT). For instance, IPTV tests can stress the capability of a multi-casting router to change multi-cast group membership of simulated in-home set top boxes as users "zap" from one channel to the next. In an east-to-west test, such as an RFC 2544 test, control signals can stress a router's ability to reconfigure handling of VLAN, BGP, MLPS and other sophisticated routing protocols while under a heavy traffic load.

Test commands reference the base templates and parameter files prepared by test authors. The majority of parameters encapsulated in a test parameter configuration file are inaccessible to end users; they are exposed to highly trained test authors and not exposed to end users of the test system.

Result commands specify information to be retrieved in-test and post-test from result collection databases. In some implementations, distributed in memory databases with dual interfaces implement in-test queries, used in dynamic result viewing, as well as post-test queries for summary reporting.

Test authors choose parameters to expose to end users. The parameters exposed to end users will be less than half of the system configuration parameters available to authors. Typically, less than 25 percent of the system configuration parameters available to authors will be exposed to end users. In many tests less than 10 percent or less than 5 percent of the system configuration parameters available to authors will be exposed to end users.

In an IPTV channel zapping test, for instance, configurable parameters exposed to an end user may include:
Number of IGMP/MLD hosts per host port (def: 4000)
Number of multicast group blocks (def: 256)
Number of addresses per multicast group block (def: 4)
Number of iterations to run the channel changing
Wait time between joins and leaves
Join latency threshold
Leave latency threshold
Stop on Fail The end user configurable parameters may further include:
Mapping pattern for channel changing
Various information about the emulated devices, stream block, etc.
Different types of protocol support This is on the order of five percent of the configuration parameters that authors specify in the multi-layered test definition data structure. An end user has only a few choices to make. Without signing in as an author, the end user is shielded from editing parameters that are difficult to understand or that have subtle impacts on the system overall.

The combination of base templates, command sequences, author accessible parameter configuration data objects, and end user exposed modifiable parameters are parts of the multi-layered test definition data structure. Tools, methods and articles of manufacture that manage, manipulate and take direction from the MLTDDS are disclosed.

Definitions

A methodology is defined to be a collection of commands and metadata that constructs a topology, runs a test, and reports summary results. There are a number of concepts within the technology disclosed, all of which can benefit from definitions of their own.

Test Methodology

Also known as a methodology package, a test methodology is a collection of files that define a methodology. A typical test methodology will contain test configuration information as well as metadata associated with the test. Configuration files in the methodology package will serve as a template for localized test cases. Test methodologies can be thought of as templates for canned tests that encapsulate domain expertise in a package that can be easily consumed by test consumers in the form of test cases.

Business Layer Logic (BLL)

Business Layer Logic (BLL) is typically realized as an XML configuration file, but can have other implementations. The XML configuration file is the native sequencer file format from STC. For testing, the business layer logic implements tests with test traffic and reports results, and provides the base of the methodology as a template. Test cases are created on the base template. BLL is also use to represent the STC layer between the automation and instrumentation layers.

Test Case

A test case is generated from a test methodology and comprises a configuration file that has been localized to a user's system including specification of physical/virtual ports and values for any other configurable test parameters. Any number of test cases can be generated from a specific test methodology.

Test Metadata

Describes the tests to be performed. Can be expressed in JSON, TXML, XML or combinations thereof. TXML is a proprietary version of XML uses for testing purposes, which conforms to a test description schema.

Authoring Environment

A development or test environment that enables the creation of tests and the publishing of those tests as distributable test methodologies.

Consumption Environment

A test-consumption environment is used to localize and execute one or more test methodologies in the form of test cases. Metadata packaged in the test methodology will be used here to quickly determine suitability of the test and its input/output parameters without the additional need to load and examine a Spirent Test Center (STC) configuration file. Test consumers will create, manage, and run test cases that are localized test methodologies.

Topology

A topology is the layout of the network to be tested and includes physical and virtual systems under test as well as Spirent test assets, including ports, emulated and simulated devices, links, stream blocks, and so on.

Command Sequencer

The command sequencer is a feature of the Spirent Test Center graphical user interface (GUI) which lets an author specify a sequence of steps in a methodology.

Emulated Topology

Layout of the Spirent Test Center (STC) ports/port groups and the simulations running behind them in relation to each other and the System Under Test (SUT). In the simplest case, this may be an EmulatedDevice block with an interface stack and a set of protocol emulations. In more complex tests, this could represent multiple EmulatedDevice blocks with different interface stacks and protocols linked together in Device-behind-Device configurations.

Topology Template

Topology templates are referred to as the base object layer. They can be stored in an XML format, a JSON format, a combination of XML and JSON, or in another data representation in other implementations, and represent a collection of data model objects. Topology templates are created using existing STC XML data model syntax/schema. It does not include sequencer information. Topology templates are loaded, customized using modifiers, expanded onto configured ports, and can be further modified to apply port and block stepping as appropriate. Topology templates can be created by handcrafting the XML in a text editor or by building the topology in the STC grid (or from the TCL API) and performing a Save As Topology Template instruction. Each of these topology templates is predefined.

Template Config

This is a container that holds the XML loaded from a topology template. This XML can be subject to further modification by other commands until it is expanded across a port or ports. The XML can also be extracted for debugging purposes.

Introduction

Running a methodology can be viewed in three phases: (1) user input, (2) execution, and (3) results. Authors will typically find it helpful to develop their methodologies in the same three phases, but in a different order: sequencer layout (execution), database query development (results), and meta.json development (user input). By authors, we mean highly skilled engineers who understand the details of complex network tests, and the relationships that can exist between those tests. Test authors are more skilled than end users. The technology disclosed differentiates between authors and end users by having the authors choose a limited number of test parameters to expose for modification by end users.

Experience thus far indicates that sequencer layout is the most independent portion of methodology authoring and should therefore come first. It is also in this phase of authoring a methodology that the functionality of the methodology is verified as correct. During the development of the sequencer layout, some of the database queries will be formed to support iteration loop branch decisions (e.g., break out of the iteration if an error is detected). After the sequencer layout is finished from a functional perspective, additional queries can be added to the end of the sequence to support additional data analysis for the results phase. It is at this point that the data for a summary chart is collected.

In one implementation, the author moves the sequencer commands under the group command MethodologyGroupCommand. In some cases, this may be after the sequencer has been fully developed and tested. In other cases, it may help the author to finish developing the methodology by utilizing the MethodologyGroupCommand as a way to pass configuration information into the sequencer while developing the sequence of commands. When the author adds the MethodologyGroupCommand that he also uses the Exposed Parameter functionality to expose command sequencer command properties for configuration input.

In parallel or in the latter phases of authoring, the author can assemble the meta.json that will be used by the user interface (e.g., STCez). While the contents of the meta.json may not be usable at first, they can help identify the properties of sequenced commands that need to be exposed.

A primary philosophy of methodologies is to expose just enough parameters to the user to help them setup the test case and run it. The driver for this philosophy is to help the user get the test running with the least amount of effort and time. Authors must understand what those few parameters are, and what assumptions they need to make for all other parameters that they do not intend to expose to the user.

FIG. 1 illustrates a system environment in which the technology disclosed is useful. As shown in FIG. 1, a plurality of integral, non-integral and/or network elements, configurable into a more distributed or more integrated manner, comprise a configurable testing environment 100 in which test process users can obtain readily configurable test processes and apply these test processes to devices or systems under test. Test system configurations vary widely according to the requirements of the user, but the example test environment 100 comprises a variety of communicatively coupled components deployable at the customer's location and/or elsewhere, including modification tool 110, network 134, test harness 125, and a multi-layered test definition data structure (MLTDDS) 130 that implements a test protocol when run on the test harness device 125. The MLTDDS 130 includes a base object layer 140, command sequence 150, command parameters 160 and exposed command parameters 162. These portions of the multi-layered test definition data structure 130 can be co-located, distributed across different systems or a combination thereof. Test environment 100 can include other components that are not shown in FIG. 1 for clarity.

In testing environment 100, test harness 125 can be operatively coupled to a system under test 185 to simulate sources and subscribers, data sources and data stores or other simulated entities to facilitate conducting test scenarios. We sometimes refer to opposing sides of the test scenario as first and second endpoints. For example, during a test involving IPTV, test harness 125 can provide input of simulated video programming such as television content, Video on Demand (VoD) or the like to system under test 185 and can receive directed traffic from the system under test 185. In another example, during a test involving RFC 2544 routing, test harness 125 can provide simulated traffic flows that can be introduced into system under test 185 and receive routed traffic from system under test 185. Other types of testing scenarios (not shown in FIG. 1 for clarity sake) in addition to the two described left/right or east/west test examples (IPTV and RFC 2544) can be provided by test environment 100 to simulate traffic flows and types as desired to facilitate certain types of testing. For example, there are single endpoint tests (like DHCP session rate or capacity tests without traffic or loopback traffic tests), or tests with greater than two endpoints, such as Openflow controller testing, north-south-east-west traffic testing, or tests extending the IPTV test to include other groups of hosts either with completely different channel viewing characteristics (i.e., a group of hosts that only watch one channel) or even other types of traffic (i.e., triple play).

Figure 2A:
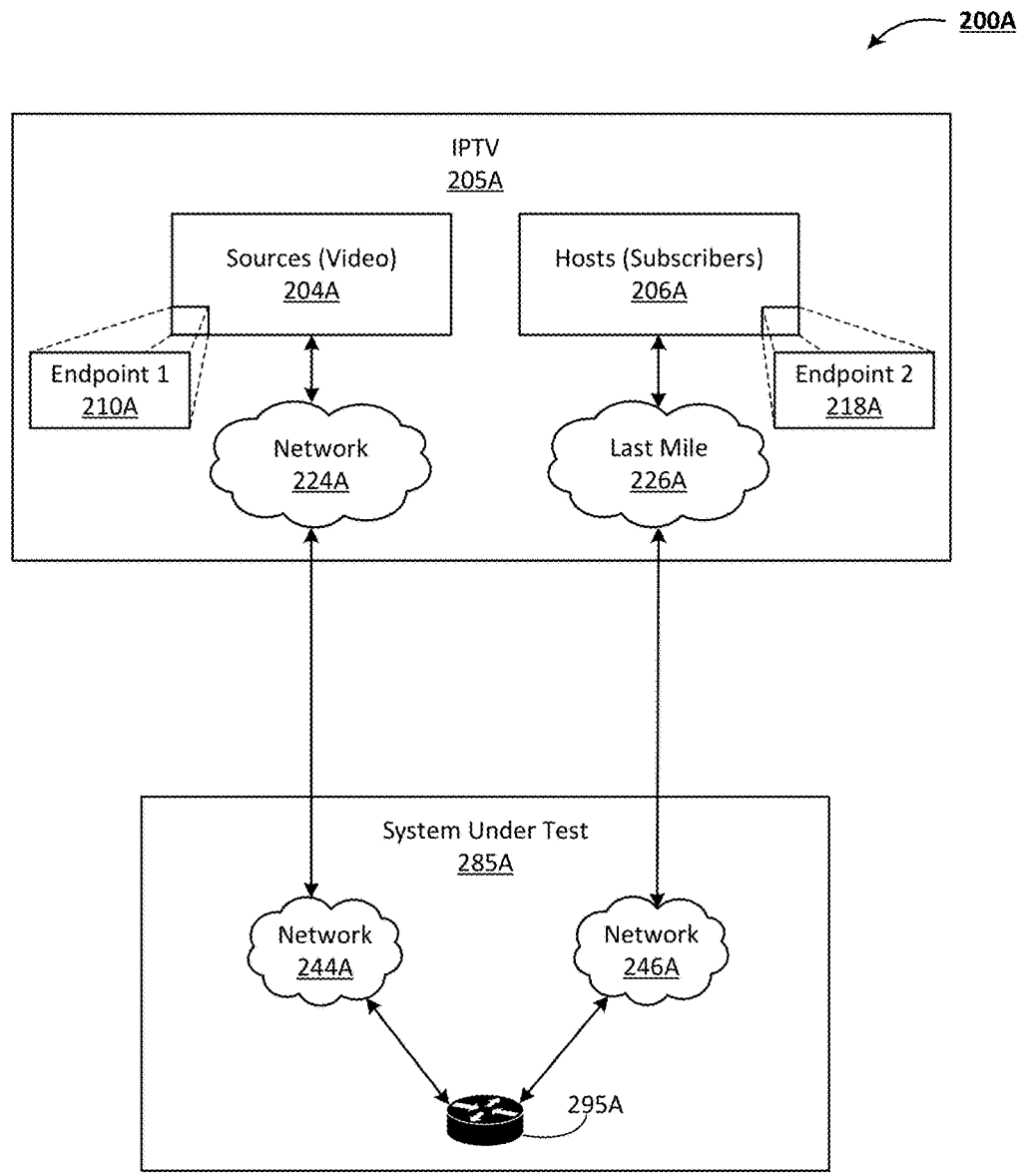
FIG. 2A illustrates adaptation of the system environment to test IPTV channel changing.

FIG. 2A illustrates adaptation of the system environment to testing IPTV channel changing. IPTV is a primary component of Triple Play services (voice, video and data). IPTV provides television content and other services such as Video on Demand (VoD) to broadband subscribers via IP. Using IPTV, a single broadcast can be sent to a worldwide audience enabling new types of service offerings and revenue opportunities. One of the most important features of any IPTV service is "channel zapping," the ability for the subscriber device to change channels rapidly. Extremely important during testing. channel zapping helps to determine just how much time users wait for video (channel gap) and/or if there are multiple IPTV streams at the same time (channel overlap). Both of these parameters will affect the users' Quality of Experience (QoE). Of great concern in any deployment of an IPTV service is the impact on the network. Since it is IP based, there could be hundreds if not thousands of video channels crossing the network, consuming gigabytes of bandwidth and affecting other services. A single HD IPTV channel could be 8 Mbps, and many providers are planning on at least four set top boxes (STB) in a single house, resulting in total potential downstream traffic of up to 32 Mbps per subscriber. Performance testing of IPTV environments can proceed under such rigorous and demanding conditions. As shown in FIG. 2A, example test configuration 200A includes a test harness 205A coupled to a system under test 285A to conduct IPTV testing. When IPTV testing is conducted, requests by subscribers to join channels are simulated by test harness 205A and system under test 285A responds by directing broadcasts of source traffic, also simulated by test harness 205A to appropriate subscriber hosts simulated by test harness.

Test harness 205A simulates a plurality of sources 204A of IPTV traffic (e.g., television content, Video on Demand (VoD) and others) to be applied by endpoints such as endpoint 1 210A, to system under test 285A and a plurality of emulated subscriber hosts 206A to receive by endpoints such as endpoint 2 218A, traffic routed by system under test 285A. Intermediary networks 224A, 226A can be defined on the test harness 205A in certain test configurations to simulate portions of the environment under which system 285A normally operates. For example, network 224A could include a satellite headend, a WAN, a video headend, a MAN, a video serving office, and the like. Last mile 226A distribution that is simulated can be wired or wireless, over copper, fiber, coaxial cable or over-the-air.

System under test 285A can include one or more devices 295A that perform traffic direction at the customer site. Devices 295A can include any number of DSLAM, EAR, VoIP servers, subscriber services, routers, gateways, switches and the like. System 285A can include intermediary networks 244A, 246A facilitating interconnection of devices 295A and sources and subscribers.

Performance of the system under test 285A can be evaluated based upon the capabilities of the system to respond to potentially large numbers of channel change requests, direct broadcast traffic to large numbers of subscribers, handle large bandwidth data streams or combinations thereof. For example, testing can include measuring the time users wait for video (channel gap), whether multiple IPTV streams are received by the user at the same time (channel overlap) and other parameters that affect the users' Quality of Experience (QoE). An high level overview of an IPTV test creation and submission process includes:

Create IGMP/MLD hosts (user input—number of hosts per port)
    Create multicast group blocks (user input—number of blocks and number of addresses per block)
    Create at least one source device on at least one source port
    Map all IGMP/MLD hosts to all multicast groups
    Start traffic
    Loop for N iterations
        Loop over the hosts and switch to next channel in pattern (user input—pattern)
        The hosts join multicast groups
        Wait X seconds
        The hosts leave multicast groups
        Save results
    Stop traffic
    Analyze duplicate joins and join fails Test configuration information in a multi-layered test definition data structure enables defining, configuring and to an extent, modifying emulated sources 204A, emulated subscriber hosts 206A, characteristics of source traffic to be routed by the system under test 285A, and configurations, connections and types of intermediary networks 224A, 226A, 244A and 246A to create the test environment 200A. Quantities, capacities, configurations and the like can vary substantially from one test to another. Further, some of these entities may not be present in some test configurations. Yet further, additional entities, not shown in FIG. 2A for clarity sake, can be present in some test configurations.

In an implementation and by way of example, simulated devices such as sources 204A, hosts 206A, and so forth, are created based upon templates. These devices can be created from a single template or from the merging of multiple templates. When the expansion process is completed, a device object is created having a Tag object associated with it, by which other commands can reference the device object.

Devices are created with an affiliation to a port. That port is part of a port group, which allows multiple ports to share a single role or profile defined by the methodology. The port, along with the other ports in its group, can be tagged with an appropriate port group's tag. The simulated devices can be affiliated with the port group tag, and thus the port group. The affiliation with an individual port in the port group can be realized using a round robin assignment amongst devices that are created.

The device itself can be tagged with a Tag object that has as its name the combined TagPrefix property prepended to the tag's name found in the template. Typically the tag name in the template is ttEmulatedDevice, and a common prefix would be east_, representing the east port group. That means the devices created through the LoadTemplateCommand with the east_ prefix for the east port group will have the same tag associated with them, east_ttEmulatedDevice.

From the authoring perspective, the port group tag can be particularly useful, because authoring the sequence of commands can includes referencing using LoadTemplateCommand the ports that do not exist until the methodology is launched; and to reference the simulated devices before they are created through the LoadTemplateCommand (technically, through the ExpandTemplateCommand, but this command is usually called by the LoadTemplateCommand after its children commands are done running or immediately after its run( ) function is called if there are no child commands).

The simulated devices have unique addresses assigned to them. Typically a unique, yet common gateway address is assigned to devices that share a single port. To accomplish this, the ExpandTemplateCommand looks to the StmPropertyModifier elements within the template for the rules by which to modify the addresses across devices, ports, and port groups. There are some properties of the StmPropertyModifier that are of interest to authors, including: (a) Start, which is the first address used when expanding the template; and (b) Step, which defines how the address is incremented, or stepped, across devices (regardless of how they are distributed across ports).

StmPropertyModifier elements are child elements of the EmulatedDevice or other element in the template. Each StmPropertyModifier is associated with one object property (e.g., one EmulatedDevice property, or one Ipv4If property, or one EthIIIf property). It defines how the value for that property will be permutated during the expansion process. StmPropertyModifier elements are assigned to properties like IP addresses, MAC addresses, gateway addresses, and so forth.

There are other properties that are not permutated during the expansion process, but some of these do help drive the results of the expansion process.

The CopiesPerParent element in the template defines how many copies of an EmulatedDevice will be created for each port in the port group that the EmulatedDevice is to be associated with. For example, if CopiesPerParent is four, and there are two ports in the port group, then there will be eight devices created by ExpandTemplateCommand, four affiliated with each port.

Figure 2B:
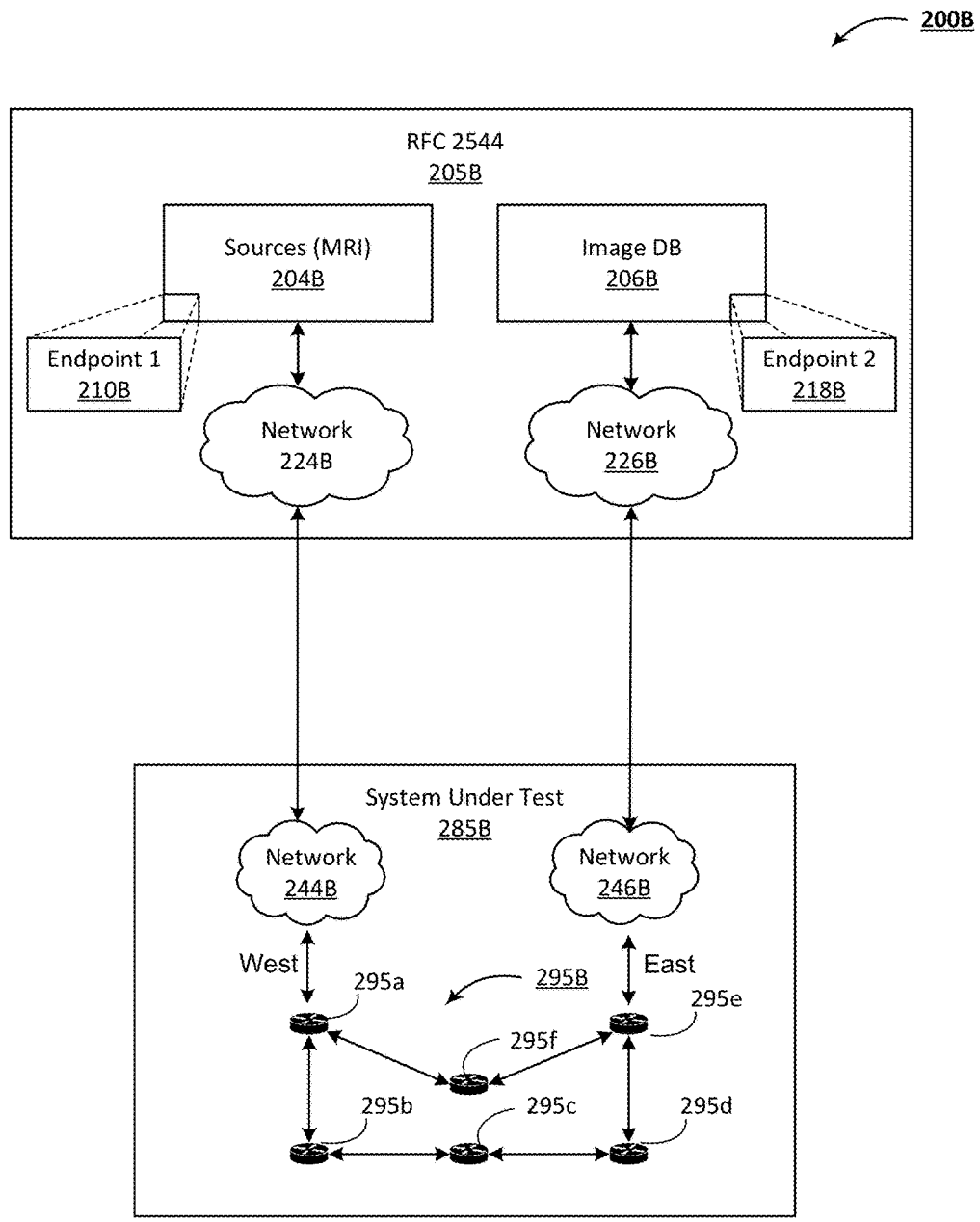
FIG. 2B illustrates adaptation of the system environment to test routing of messages through an East-West router network as used, for example, in data centers and corporate networks.

FIG. 2B illustrates adaptation of the system environment to testing routing of messages through an East-West router network as used, for example, in data centers and corporate networks. The objective of conducting throughput testing is to determine the throughput of a device/system under test (DUT/SUT). Throughput is defined in RFC 1242 as the maximum rate at which none of the offered frames are dropped by the device. During throughput testing, test frames are sent at a specific frame rate and the number of frames forwarded by the DUT is counted. If there is any frame loss, the rate is decreased; otherwise, the rate is increased. Test trials can be repeated until the maximum rate is found at which there is no frame loss. RFC 2544 does not specify an algorithm to implement, however the most common approach is a binary search algorithm. Tests can be repeated for varying frame sizes.

As shown in FIG. 2B, example test configuration 200B includes a test harness 205B coupled to a system under test 285B to conduct testing in accordance with RFC 2544. When RFC 2544 testing is conducted, source data, such as MRI data from sources 204B, are simulated by test harness 205B and forwarded to system under test 285B for routing. System 285B responds by directing the traffic to the appropriate destinations, i.e., image databases 206B also simulated by test harness 205B.

Test harness 205B simulates a plurality of sources 204B of routable traffic (e.g., MRI images and others) to be applied by endpoints such as endpoint 1 210B, to system under test 285B and a plurality of simulated image databases 206B to receive by endpoints such as endpoint 2 218B, the image traffic routed by system under test 285B. Intermediary networks 224B, 226B can be defined on the test harness 205B in certain test configurations to simulate portions of the environment under which system 285B normally operates. For example, network 224B could include an MRI interface, LAN, WAN, a MAN and the like.

System under test 285B can include one or more devices 295B that perform traffic direction at the customer site. Devices 295B can include any number of servers, routers, gateways, switches and the like. System 285B can include intermediary networks 244B, 246B facilitating interconnection of devices 295B and sources and recipients. FIG. 2B illustrates system under test 285B including a Level 2 Multi Path (L2MP) network with North/South and East/West alignment, which can utilize advanced network protocols such as Multipath TCP or Shortest Path Bridging. In this example, the distribution layer is removed, and multiple paths are defined, both physically and logically, between the networking devices. With this configuration, the core routers 295a-295f, collectively known as 295B, can have multiple paths to any networked device. This can free up network equipment from the distribution layer to be redeployed as access layer devices, where devices such as Network 244B and Network 246B can be attached. This more fully utilizes the bandwidth available for each network device, but adds complexity for configuration and testing.

Performance of the system under test 285B can be evaluated based upon the capabilities of the system to respond to a plurality of criteria, including throughput, back-to-back burst-ability, frame loss, latency, system reset speed, and system recovery speed.

Throughput measures the maximum rate at which none of the offered frames are dropped by the device/system under test (DUT/SUT). This measurement translates into the available bandwidth of the Ethernet virtual connection.

Back-to-back or burst-ability measures the longest burst of frames at maximum throughput or minimum legal separation between frames that the device or network under test will handle without any loss of frames. This measurement is a good indication of the buffering capacity of a DUT.

Frame loss defines the percentage of frames that should have been forwarded by a network device under steady state (constant) loads that were not forwarded due to lack of resources. This measurement can be used for reporting the performance of a network device in an overloaded state, as it can be a useful indication of how a device would perform under pathological network conditions such as broadcast storms.

Latency measures the round-trip time taken by a test frame to travel through a network device or across the network and back to the test port. Latency is the time interval that begins when the last bit of the input frame reaches the input port and ends when the first bit of the output frame is seen on the output port. It is the time taken by a bit to go through the network and back. Latency variability can be a problem. With protocols like voice over Internet protocol (VoIP), a variable or long latency can cause degradation in voice quality.

System reset measures the speed at which a DUT recovers from a hardware or software reset. This subtest is performed by measuring the interruption of a continuous stream of frames during the reset process.

System recovery measures the speed at which a DUT recovers from an overload or oversubscription condition. This subtest is performed by temporarily oversubscribing the device under test and then reducing the throughput at normal or low load while measuring frame delay in these two conditions. The different between delay at overloaded condition and the delay and low load conditions represent the recovery time.

Figure 3:
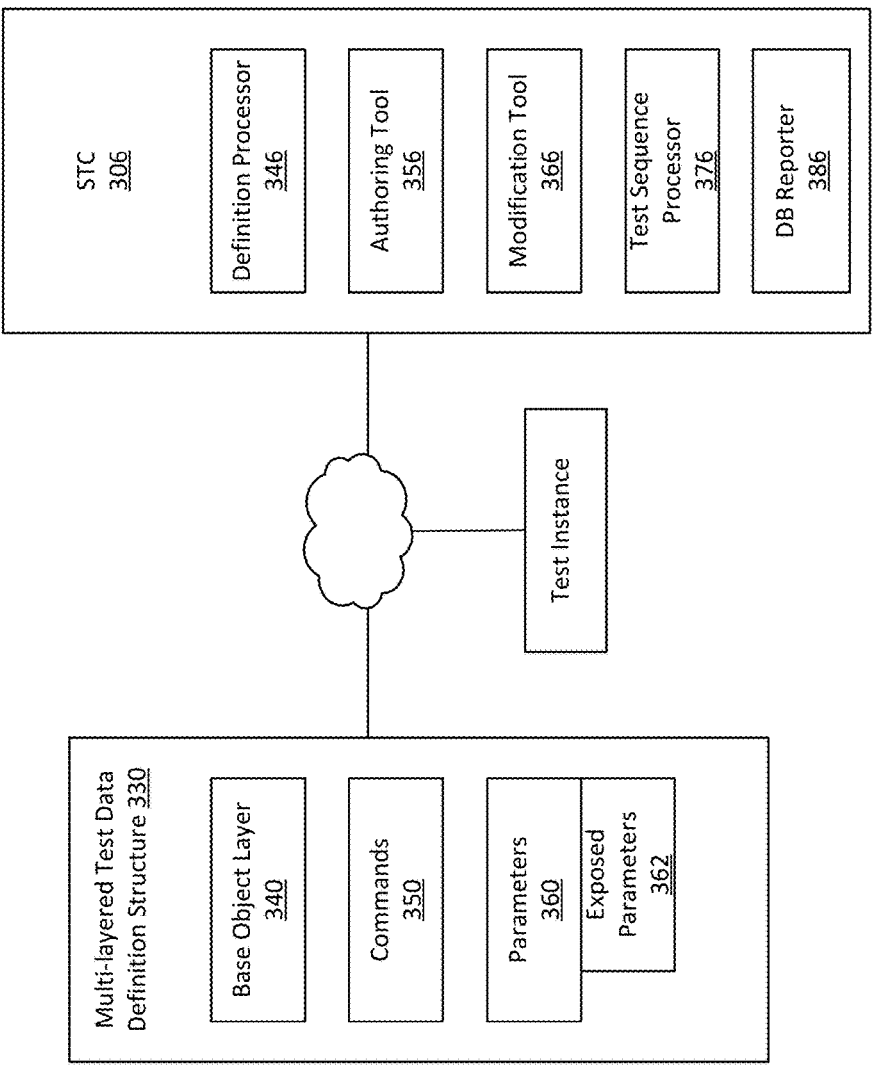
FIG. 3 illustrates a multi-layered test definition data structure.

FIG. 3 illustrates a multi-layered test definition data structure. Use of a multi-layered test definition data structure (MLTDDS) enables transforming the user experience by providing test expertise to show customers how to test, and eliminate the need for customers to learn how to test on their own, similar to using apps on a smartphone, with each app targeted on a specific problem.

A multi-layered test definition data structure (MLTDDS) 330 includes a base object layer 340, command sequence 350, command parameters 360 and exposed command parameters 362. Exposed parameters are parameters that are exposed to end users to facilitate limited modifications of test process function. End users can modify values assigned to the exposed parameters to modify testing. Authors are enabled to have control over modifications made to their test cases by exposing certain parameters but restricting the remaining parameters because the user is prevented from modifying the non-exposed parameters. In an implementation, the test author locks against editing by the end user, command parameter data that is not exposed by ensuring that non-exposed parameters are not included in a JSON (or other format) data structure. This capability to distinguish certain command parameters as exposed, while locking out the remaining parameters, enables a relatively lesser skilled end user limited ability to modify test configurations developed by an expertly skilled author in a controlled and "safe" manner. The ExposedProperty, which is an object used for exposed parameters, is a BLL object that is used by the MethodologyGroupCommand as a means to reference sequencer commands' properties to pass information from the UI to those properties. Authors expose sequenced commands' properties for use with the MethodologyGroupCommand.

These portions of the multi-layered test definition data structure 330 can be co-located, distributed across different systems or a combination thereof. Data structure 330 is coupled to a test center 306 to provide test instances for test environment 300. Some implementations of test environment 300 can include other components that are not shown in FIG. 3 for clarity sake. Test center 306 includes a definition processor 346, an authoring tool 356, a modification tool 366, a test sequence processor 376 and a database reporter 386.

Definition processor 346 processes definitions in test definition files, which may be in XML, TXML, JSON or combinations thereof, to configure properties and perform tests. For example, the sequencer.xml file is the Business Layer Logic (BLL) XML configuration file. For testing, the business layer logic implements tests with test traffic and reports results. The configuration file contains the sequencer command list, the exposed parameter objects that refer to targeted properties of various commands, and tags that help form relationships with objects that do not yet exist in the configuration.

In an implementation the configuration does not include ports, because the framework will create the ports for the methodology before execution begins. However, during the authoring cycle, the author may wish to include ports so that the development of the sequencer functionality doesn't require creating and tagging ports each time the sequencer.xml is loaded. It is when the sequencer is ready for publishing that the ports are removed (but their port group tags must remain in the sequencer.xml file).

Authoring tool 356 can provide a development or test environment that enables the creation of tests and the publishing of those tests as distributable test methodologies.

Modification tool 366, in conjunction with exposed parameters depicted by FIG. 6A and further described herein below, provides a mechanism by which end users can customize or configure certain test cases by altering values of certain parameters exposed to the end user.

Test sequence processer 376 controls execution of the test cases applied by the test harness to the system under test. Within the command sequencer is the heart of the test case algorithms—the activities that the methodology performs to exercises and study the DUT/SUT. One implementation of the command sequencer is generally comprised of three sections: (a) instantiating objects, (b) performing test activities, and (c) generating report information. Commands within the sequencer need to reference other commands and objects for the purpose of information transfer (typically for configuring). There are several means available depending upon the type of data being passed around, including inheritance, property chaining, other parameter passing mechanisms and combinations thereof, which are described in detail below with reference to FIG. 5A.

Database reporter 386 can provide generation of reports from test results stored in the database(s) during the testing. Charts, graphs, tables and other report types are available in select implementations to enable the end user to understand the performance of the system under test during the test process.

Figure 4:
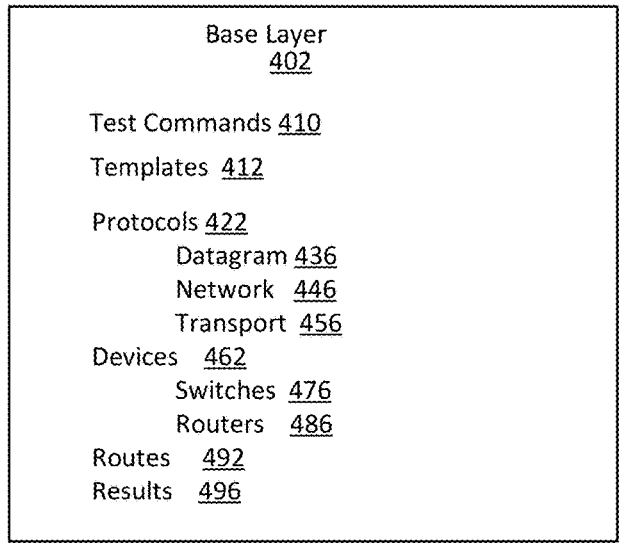
FIG. 4 illustrates base templates used to prepare a test command sequence.

FIG. 4 illustrates base templates used to prepare a test command sequence. As shown by FIG. 4, an implementation includes base layer 402 that includes a variety of data objects for configuring a test. Base configuration for a test is comprised of base test commands 410, base topology templates 412, protocols 422, devices 462, routes 492 and results 496.

A list of base test commands 410 includes without limitation: an stc_methodology_routing command group, an stc_methodology_sampling command group, an stc_methodology_traffic command group, an stc_methodology_traffictest command group, an stc_methodologymanager command group, and an stc_testmethodology command group. Other command groups can be provided in implementations and some implementations can have fewer command groups, and/or different command groups.

The stc_methodology_routing command group includes commands that import routing tables, create routing mixes across the SUT, expands the route mix templates into configuration objects, and creates tag names of emulated devices or router configuration object for attachment of routes.

The stc_methodology_sampling command group includes commands to create subscriptions to polled results from devices within the SUT. These subscriptions include the database tables of record, timeout values to mark completion of a subscription, property lists by class name, and polling intervals.

The stc_methodology_traffic command group includes commands to create and distribute traffic load across devices included within the SUT.

The stc_methodology_traffictest command group includes commands that define properties such as streamblock tag names, packet loss count thresholds, maximum jitter and latency thresholds, maximum out of order packet count thresholds, and maximum late packet count and duplicated packet count thresholds.

The stc_methodologymanager command group includes commands that manage creation, configuration, deletion, and execution of test cases. It also includes command for exporting and publishing of methodology packages and other related operations such as loading methodologies for modification and so forth.

The stc_testmethodology command group is the largest command group within the methodology infrastructure and includes a variety of functional aspects, including creation, manipulation, modification, and expansion of topology templates, iterations and an iteration framework, including benchmarking, and results collection, verification and graphing. In one implementation, there are over 50 commands including properties that create and configure the databases for results storage, benchmark configurations, iterations, relationships between objects, reports and charts, protocol mixes, and base template management.

Each of the foregoing base command groups can contain a plurality of commands. An example of one command taken from the stc_testmethodology.xml command group includes for example, CreateTemplateConfigCommand, which is one of more than 50 commands in this command group. The CreateTemplateConfigCommand command can be used in at least the following tests: BGP Route Reflector Test, Routing Multi-Protocol, ITU-T Y.1564 Service Performance Test, RFC 2544 Throughput Test, ITU-T Y.1564 Service Configuration Test, and IPTV_MULTICHANNEL Test.

One property within CreateTemplateConfigCommand is the CopiesPerParent property. The CopiesPerParent property has a default value of 1, but can be set to any value, which sets the number of copies of the selected template to make per target tag object, which in our example would equal the number of hosts configured for the test. Following are properties of CreateTemplateConfigCommand:

---
CreateTemplateConfigCommand
---
Creates an StmTemplateConfig by loading an XML template and modifying it.
- Properties
- AutoExpandTemplate (input:bool)
  - "Automatically Expand Template"
  - True expands the template mix before command completes. False will not expand the template mix.
  - default: true
- StmTemplateMix (input:handle)
  - "Parent StmTemplateMix object"
  - Handle of an StmTemplateMix object to use for the parent of the created StmTemplateConfig.
  - default: (empty)
- InputJson (input:string)
  - "JSON Input"
  - JSON string representation of parameters to load and modify template(s) into the StmTemplateConfig.
  - default: {"baseTemplateFile": "IPv4_NoVlan.xml"}
- CopiesPerParent (input:u32)
  - "Number of copies to make per Target Tag object"
  - Number of copies of the template to make per Target Tag object.
  - default: 1
- SrcTagList (input:string)
  - "Source Tag List"
  - List of tags that indicate where in the XML template the config will be expanded from.
  - default: (empty string)
- TargetTagList (input:string)
  - "Target Tag List"
  - List of tags that indicate where in the STC configuration the template will be copied to. If empty, the target will be assumed to be Project.
  - default: (empty string)

---
CreateTemplateConfigCommand
---
- StmTemplateConfig (output:handle)
  - "XML container object (StmTemplateConfig)"
  - StmTemplateConfig container object
  - default:(empty)

Templates 412 include commands for a test that are selected from the command groups, including their default properties. The selected commands are applied to a list of available base topology templates. The list of base topology templates can include the following: All routes templates: AllRoutePrefixDist, AllRouters, and AllRoutes; BGP templates: BGP_Import_Routes, BGP_IPv4_Receiver_PE, and BGP_IPv4_Source_PE; Dual templates: Dual_NoVlan and Dual_Vlan; GreIPV4 templates: GreIpv4_NoVlan and GreIpv4_Vlan; IPV4 templates: Ipv4_DiffServ_BE_Stream, IPv4_NoVlan, Ipv4_QinQ_AF11_Stream, IPv4_QinQ_EtherSam, Ipv4_RangeStreamFragMF, Ipv4_RangeStreamFragOffset, Ipv4_RangeStreamSrcDstIp, Ipv4_RawRangeStream, Ipv4_Stream, and IPv4_Vlan; IPV6 templates: IPv6_NoVlan, and IPv6_Vlan; multicast templates: Multicast_Group and Multicast_Igmp and miscellaneous templates: Tcp_IPv4_NoVlan, and Access_Protocols.

Each of these base topology templates has preset property values. For example, following is a description for the StreamBlock Class within the Ipv4_Stream.xml template:

- Template Map
  - StcSystem
    - Project
      - StreamBlock:ttStreamBlock ttStreamBlock
(ClassName: StreamBlock)
Object Property Reference

| Property | Value |
|---|---|
| AutoSelectTunnel | FALSE |
| EnableTxPortSendingTrafficToSelf | FALSE |
| EnableBackBoneTrafficSendToSelf | TRUE |
| EnableBidirectionalTraffic | FALSE |
| serializationBase | TRUE |
| AdvancedInterleavingGroup | 0 |
| TrafficPattern | PAIR |
| id | 2111 |
| InsertSig | TRUE |
| StepFrameLength | 1 |
| IsControlledByGenerator | TRUE |
| ConstantFillPattern | 0 |
| AllowInvalidHeaders | FALSE |
| LocalActive | TRUE |
| ControlledBy | generator |
| ShowAllHeaders | FALSE |
| ByPassSimpleIpSubnetChecking | FALSE |
| Active | TRUE |
| EndpointMapping | ONE_TO_ONE |
| Name | Basic StreamBlock |
| EnableHighSpeedResultAnalysis | TRUE |
| Filter | <null> |
| FixedFrameLength | 128 |
| MinFrameLength | 128 |
| EqualRxPortDistribution | TRUE |
| EnableResolveDestMacAddress | TRUE |
| MaxFrameLength | 256 |
| FrameConfig | <null> |
| EnableStreamOnlyGeneration | TRUE |
| EnableControlPlane | FALSE |
| FrameLengthMode | FIXED |
| DisableTunnelBinding | FALSE |
| FillType | CONSTANT |
| EnableFcsErrorInsertion | FALSE |

Other templates, such as the AllRoutePrefixDist.xml template, can have dozens of classes defined, each with its own list of properties.

Protocols 422 can include by way of examples, datagram protocol(s) 436, network protocol(s) 446, transport protocol(s) 456 and the like.

Devices 462 can include for example, switches 476, routers 486 and the like.

Routes 492 include routing through a network(s) under test.

Results 496 include commands for subscribing to databases of test data, querying test data results, creating reports, charts and graphs.

Figure 5A:
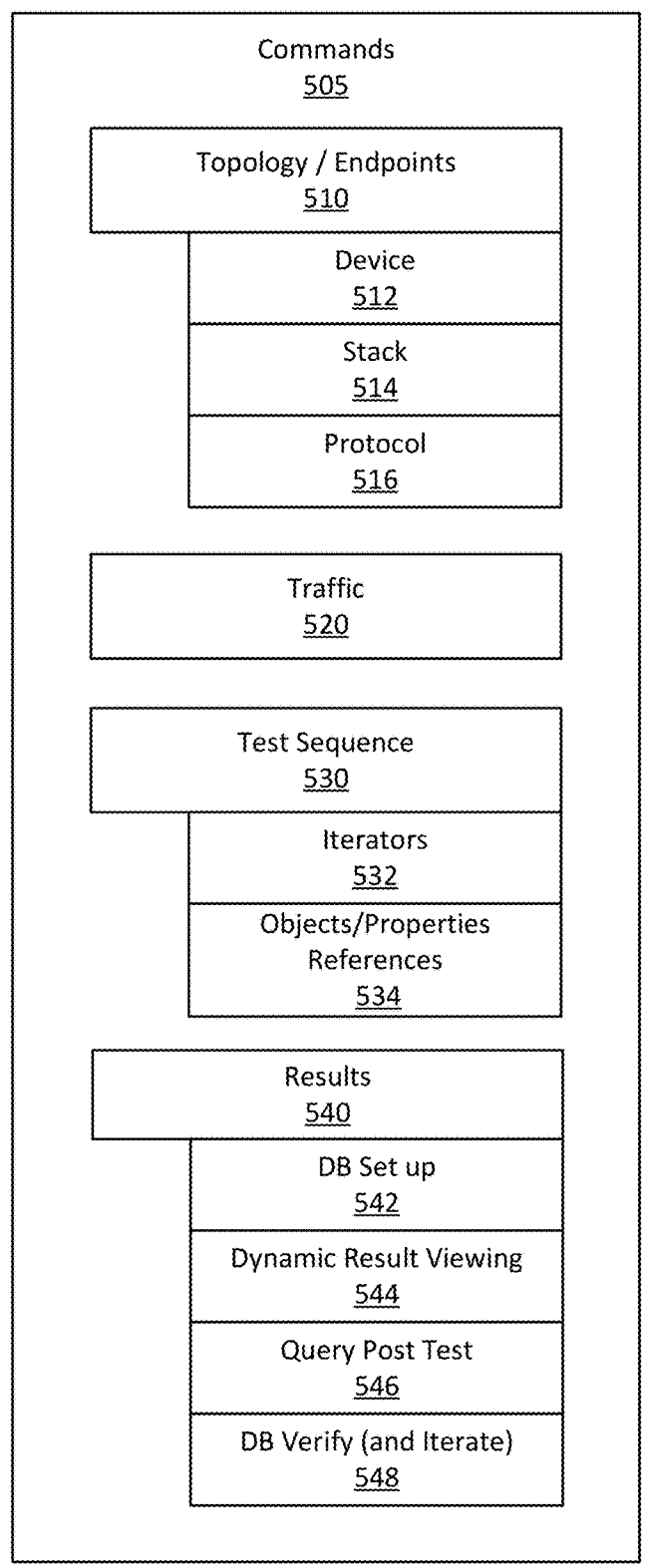
FIG. 5A illustrates test and test control commands.

FIG. 5A illustrates test and test control commands. At a high level, functionality of test commands can include getting a List of Methodologies, getting Methodology Info about a particular methodology, running a methodology test, terminating a test before completion, and subscribing to or retrieving a result in-test or after completion of the test. Families of test and control commands 505 include topology 510, traffic 520, test sequences 530 (including iterators 532) and results 540.

Topology 510 includes devices 512, stacks 514 and protocols 516. These types of commands govern network topology and endpoint control. The CreateProtocolMixCommand provides authors with a straight forward and very powerful way of creating devices with practically unlimited combinations of protocols. This command allows the author to specify multiple devices, each with independently configured protocol configurations. For example, a single protocol mix can define three devices—the first device with BGP IPv4, the second device with OSPFv2 and ISIS IPv4, and the third device with OSPFv3 and BGP IPv6. The CreateProtocolMixCommand will auto generate a number of child commands under it in an iteration command sequence structure. With each iteration, devices are created, associated with a port, and configured with a set of protocols.

The MixInfo parameter holds a string that contains JSON information. The JSON object represents the configuration for one protocol mix. As is typical, the mix contains one or more components, each component describing a unique combination of protocols for one or more devices. Each component can be thought of as a sub profile of the mix configuration.

The CreateRouteMixCommand provides authors with a straight forward and very powerful way of creating routes for devices with protocols. This command allows the author to specify a variety of routes for devices using any supported protocol. For example, a single route mix can define OSPFv2 types of routes, ISIS types of routes for either ISIS/IPv4 or ISIS/IPv6, and BGP types of routes for EBGP or IBGP, either IPv4 or IPv6. Routes can be manually (user specified) configured or prefix distribution generated. In the case of BGP route types, route import is also a supported type of route generation. A Tier 2 command, the CreateRouteMixCommand will auto generate a number of child commands under it in an iteration command sequence structure. With each iteration, routes are created and associated with a device or group of devices.

The MixInfo parameter holds a string that contains JSON information. The JSON object represents the configuration for one route mix. As is typical, the mix contains one or more components, each component describing a set of route generation rules for one or more devices. Each component can be thought of as a sub profile of the mix configuration.

Traffic 520 commands operate over a topology. For example, The CreateTrafficMixCommand provides authors with a straight forward and very powerful way of creating both bound and raw streamblocks. This command allows the author to specify a variety of streamblocks that share a common port as traffic source. This allows the mix to describe a total bandwidth (not exceeding that of the port) that the mix will consume, and that each component owns a slice of.

The MixInfo parameter holds a string that contains JSON information. The JSON object represents the configuration for one traffic mix. As is typical, the mix contains one or more components, each component describing a set of streamblocks and their expansion rules. Each component can be thought of as a sub profile of the mix configuration.

Figure 5B:
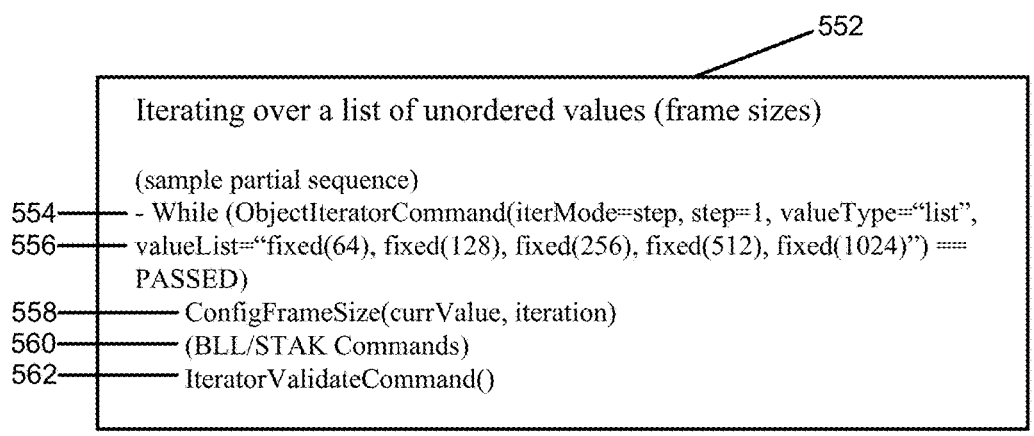
FIG. 5B illustrates an example iterator in a non-procedural test sequence.
Figure 5C:
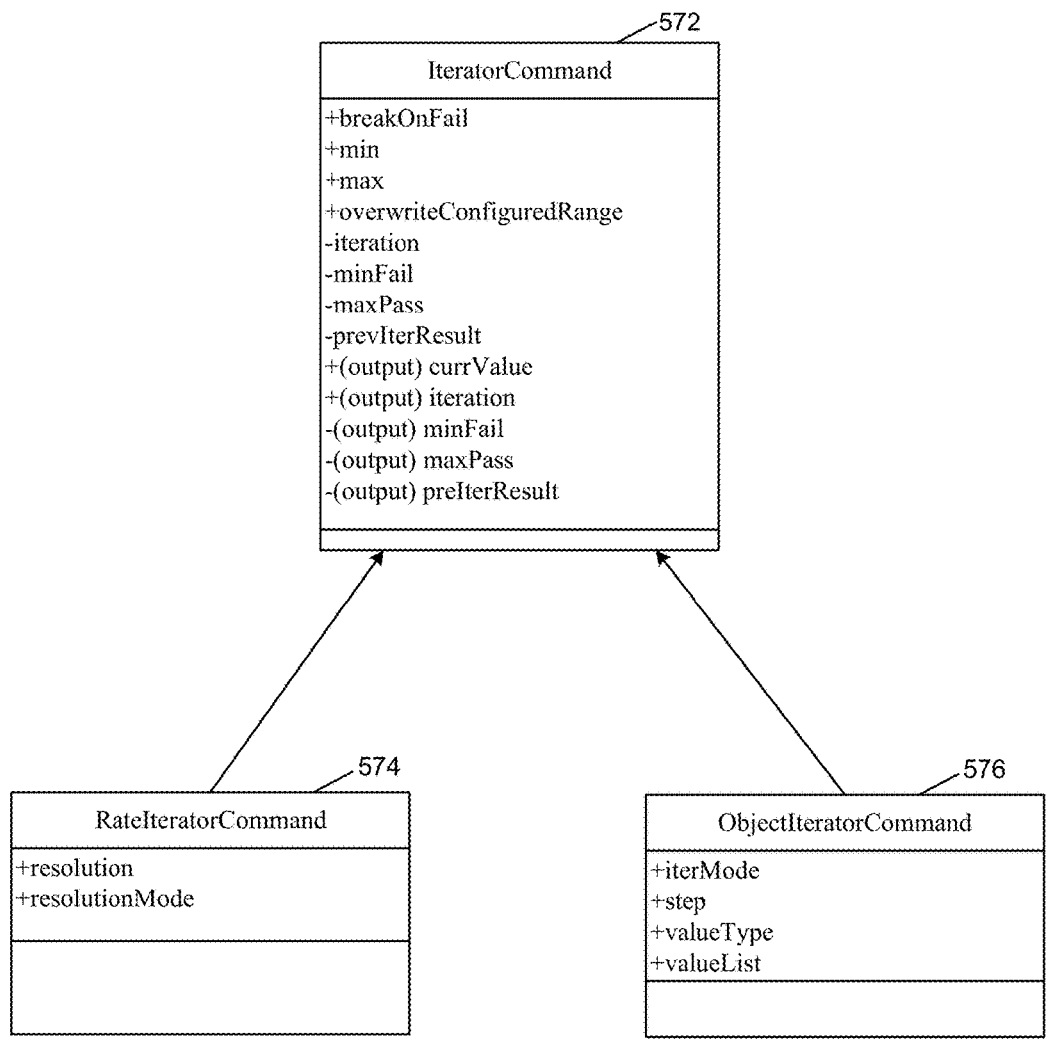
FIG. 5C illustrates classes implementing an iterator in the non-procedural test sequence.

Test sequence commands 530 include iterators 532, which are illustrated by FIGS. 5B-5C and described in detail below, and commands 534 for referencing objects and object properties. There are three primary reference commands 534 to reference objects and object properties: property chains, exposed properties, and tags. Each method will be described seriatim:

The concept of property chaining comes from sequencer group commands that needed a way to pass their output property values to the input property values of their children commands. It is a straight forward concept, and the passing of values occurs automatically by the sequencer framework at the moment that the command is done executing. While other scenarios of passing property values from one command to another are strong candidates for using property chaining, the manual setup of the chain is not that easy.

When passing a value from a source command's output property to a destination command's input property (it is assumed that the source command will execute prior to the destination command), property chaining is recommended, even in those cases where a parent-child relation does not exist.

Property chains persist across multiple loading of the sequencer.xml, so the author should need to establish the chain once. An example code to create a property chain that connects two source properties to two target properties is:

```
stc::perform AddPropertyChainingCommand
    sourcePropertyIdList
    spirent.methodology.traffic.ImportTrafficMixRulesCommand.TotalIterations
        sourceCommandList  spirent.methodology.traffic.importtrafficmixrulescommand1
        targetPropertyIdList  spirent.methodology.objectiteratorcommand.MaxVal
        targetCommandList  spirent.methodology.objectiteratorcommand1
```

Tags are convenient labels selected by a programmer and assigned to objects to enable referencing the objects during test. Tags are convenient because they can be used in lieu of the objects themselves. Tags are instantiated at runtime, which allows them to be used when the number of objects is not set, allowing for scalability.

Results commands 540 enable database setup 542, to capture and store test results, dynamic result viewing 544, to work with test results (e.g., report generation and such), query posttest 546, to verify and query test results databases.

In an implementation, the iteration framework includes the database verify 548 mechanism that doubles as part of the results framework. By verifying data within the database, the iteration loop can determine when a criterion is met to perform an early exit of the iteration loop.

There are two primary commands used for this purpose, the VerifyDbQueryCommand, and the VerifyMultipleDbQueryCommand. Both of these use the same principle of executing an SQL query against one or more database files, and then determine if the number of rows in the result set meet a preconfigured requirement or not. This last part is the Boolean value that drives the IteratorValidateCommand by which the iteration loop can potentially perform an early exit.

One difference between VerifyDbQueryCommand and VerifyMultipleDbQueryCommand is that the latter has multiple queries that can be performed, each producing a single Boolean value. If any one of the queries results in a fail, then the final verdict is a fail (they all must be pass for the final verdict to be pass).

Both commands have the option to query against the summary database, the latest iteration database, or all of the iteration databases. In the last case, the same query is executed once for each iteration database, and the result sets are simply combined into one result set.

In addition to driving the early exit of an iteration loop, the same result sets are passed to the results framework and are included in the final report. The inclusion of the data is not optional from an authoring perspective, but is presented in a drill down style.

When a verify command is executed and the results is a fail, the results can impact the iteration loop to perform an early exit. But more importantly, when it is authored to yield a failing verdict, it is important for the result set to have detailed information by which the user can learn what went wrong.

Typically the verify command will fail if a query produces a result set that has data in it, and the data itself will shed light on what went wrong. For example, if the jitter value exceeded a threshold, then the result set will include information that will indicate what the threshold was set to, what the jitter value was measured at, and other information that would help the user understand the nature or root cause behind the threshold being exceeded.

It is when there is no failure that the result set can return no data, because there is not as great of a need to report anything other than a summary status. For these reasons, it is typical for the commands to be configured so that the expected row count is equal to zero.

However, there are times when a table of data is simply desired. For these cases, the same commands can be used, and the verdict is not applied to the report (neither pass nor fail). In these cases, the result set produced will be a table of data that is generated.

There are times when authoring a methodology can include special querying of the current set of databases, either during an iteration loop, or at the end of the methodology's command sequence; situations for which these verify commands are insufficient. For these cases, in one implementation, a python script can be written that will perform the appropriate queries, collect the data, and pass the data to the results framework directly and in the fashion best suited for the desired report.

One result type that can be generated is charts.

FIG. 5B illustrates an example iterator in a non-procedural test sequence. In a many test configurations, it is desirable to have the capability to iterate over things—routes, frame sizes, traffic loads, flows, and the like. Accordingly, an implementation includes a framework to handle iteration such that different values can be used depending on what is to be iterated over and how the iteration is desired to be accomplished. In one implementation, an iterator framework includes: iterators, configurators and optional validators.

Iterators

Iterators run binary or step search and track iteration state, end a test when the iteration is finished, and pass the next value to the configurator. The iterator does not need to know what it is passing to the configurator or how the configurator will use it. Types of iterators include object iterators, rate iterators and combination iterators. Object iterators iterate over discrete objects according to a step, e.g., increment by some step amount, a binary rule, e.g., perform a discrete binary search. Object iterators can be useful for iterating over different routes, sessions, and the like. Rate iterators can be useful for performing binary search on rate values. The binary search performs a "true" binary search. A combo iterator combines step and binary search and can be useful in performing RFC 2544 test configurations.

Configurators

Configurators configure a set of objects with a value passed in from an associated iterator. One type of configurator is the Config_Frame_Size, which configures a plurality of stream blocks with a frame size. Another type of configurator is the Config_DHCPv4_Session_Count, which configures the device count on a plurality of emulated devices enabled with DHCPv4. A further type of configurator is the Config_Traffic_Load, which configures the load on a streamblock (Rate-Based) or on the port (Port-based). A yet further type of configurator is the Config_BGP_Route_ Count—Configures the number of routes in the route block (separate from a config router count which would add or remove Emulated Devices).

Validators

Validators determine whether an iteration passed or failed based on test-specific criteria and returns a verdict to the iterator. In an implementation, validators return True (PASS) or False (FAIL) to the Iterator. For profiling, this value can be ignored. One type of validator is the Validate_Traffic_Results, which validates traffic results such as frame loss, dead streams, and the like. Another type of validator is the Validate_DHCPv4_Session_Results, which validates session activation results. A further type of validator is the Validate_BGP_Route_Results, which validates whether routes were advertised and can use traffic to verify.

Structure

In an implementation and by way of example, iterators can be structured generally as indicated by the following example:

```
- While (Iterator == PASSED)
    Configurator
    (Commands that form the body of the iteration)
    Validator
```

The iterator can be associated with a SequencerWhileCommand that takes an iterator as its expression command. The iterator returns PASSED until it is done iterating, at which point it returns FAILED to break out of the loop.

The iterator passes the new "test" value to the test-specific configurator. The configurator configures the data model objects. A test-specific block of commands is run that form the body of the iteration. An optional test-specific validator determines the iteration result and passes that back into the iterator.

EXAMPLES

In an example application, an object iterator is used to iterate over a (potentially unordered) list of frame sizes; e.g., "fixed(64)", "imix(spirent)", "incr(64,64,256)", "fixed (1024)", "fixed(512)". The iterator is agnostic to what is in the list of frame sizes. The index is what is really iterated over (min=0, max=4, step=1). In this example, the configurator uses the current value to determine how to configure the streamblocks. The following table 1 illustrates the iterations, index and list values for this example:

TABLE 1

Iterator Example 1

| Iteration | Index | currVal |
|---|---|---|
| 1 | 0 | fixed(64) |
| 2 | 1 | imix(spirent) |
| 3 | 2 | incr(64, 64, 256) |
| 4 | 3 | fixed(1024) |
| 5 | 4 | fixed(512) |

In this example, an iterator steps through the five values in the list and breaks out of the loop when there are no more values to test. This is an example of a list iterator. Code and control blocks generated to govern the foregoing example is depicted in FIGS. 5B-5C and described in further detail below.

In another example application, iterators employ a binary search technique to determine how many BGP routes a particular system under test can accommodate, starting with 100 routes, "step" by 100, to a max of 1000. Due to the "step" value, the current value must be a multiple of 100 per iteration. Suppose the system under test can actually handle 748 routes. The iterator determines the current configurable value and passes this to the configurator. The configurator configures the appropriate objects. In the following table 2, column maxPass holds the maximum test value for which a previous iteration passed. Column minFail is the minimum test value for which a previous iteration has failed:

TABLE 2

Iterator Example 2

| Iteration (iteration) | maxPass | minFail | currVal | Result |
|---|---|---|---|---|
| 1 | −infinity | +infinity | 500 | PASS |
| 2 | 500 | +infinity | 800 | FAIL |
| 3 | 500 | 800 | 700 | PASS |
| 4 | 700 | 800 | (DONE) | |

In this example, at iteration four, the iterator will determine that maxPass and minFail are within 100 units of each other so the test is finished.

As shown by FIG. 5B, a further example of an iteration command 552, in which iteration can be performed over a list 556 of frame sizes the sizes are 64, 128, 256, 512 and 1024. While list 556 is depicted as ordered for clarity, there is no need for ordering and other object types than fixed integers can be used as values in the list 556.

Under control of an IteratorCommand 572 (in FIG. 5C and described in further detail below) that accepts input parameters used to keep track of the state of the iteration, an ObjectIteratorCommand 554 shown in FIG. 5B is executed at the top of each iteration. Once it finishes executing, command 554 goes out of scope and is not run again until the next iteration. The commands inside the iteration, e.g. ConfigFrameSize( ) 558, BLL/STAK Commands 560 and IteratorValidateCommand 562, are run independently of the ObjectIteratorCommand 554. Thus, the technology disclosed provides a method for capturing and communicating the results of the commands executed inside of an iteration to the IterationCommand itself by "chaining" multiple outputs from arbitrary internal commands as inputs to the iteration command.

The ObjectIteratorCommand 554 outputs an index of the current object in the enumerated list that can be used as an index to determine a second protocol parameter used in execution of the test script. Alternatively, list items can include multiple values to capture multiple protocol parameters, such as (1500, IPv4), (9000, IPv6).

While iteration functionality has been discussed with reference to an example in FIG. 5B that illustrates ObjectIteratorCommand 554 with a "while" block, other iteration control structures such as "for" or "repeat" also can use an IterationCommand 572 (FIG. 5C) class to control iteration behavior. Further, in implementations, iteration frameworks can offer authors a collection of commands that will meet many use cases of iterating over common test parameters.

Commands

A framework's commands can be classified into several groups, including: iteration group commands, iterator commands, configurator commands, verify commands and others.

The iteration group commands include an IterationGroupCommand. Each iteration loop is driven through a SequencerWhileCommand, which itself sits under an IterationGroupCommand. The IterationGroupCommand is responsible for chaining properties between the various iteration framework commands that are directly under it (both child and grandchild commands). The IterationGroupCommand holds the SequencerWhileCommand and can therefore know when the iteration loop is finished. Upon completion of the iteration loop, the results framework is notified that the current iteration level is completed. This allows for nesting of iteration levels within reports.

Iterator commands are nouns preceded by an adjective that typically describes what is being iterated over. For example, the ObjectIteratorCommand will iterate over a list or range of values, either in a straight forward or binary search fashion. What is being iterated over is a range, but the values applied to any generic object. These commands act as the expression to the SequencerWhileCommand and determine if the while loop should continue to loop or break out past the loop. Each iterator is derived from the base command IteratorCommand.

Configurator commands include the phrase IteratorConfig, a noun and verb that imply the command will configure what comes next in the command name. For example, IteratorConfigFrameSizeCommand will use the iteration's current value to configure frame sizes. Each iterator configurator is derived from the base command IteratorConfigCommand.

The verify commands can be used to analyze information collected during the iteration pass. For example, each iteration loop will need either SaveResults or SaveIterationResults to save the system results and state information to a database file. After either of these two commands is performed, one or more of these verify commands create a verdict value that finds its way back up to the IteratorCommand so that the latter can determine what it should do based upon the results of the previous iteration—whether the iteration loop should continue or exit. Note that the verdict from the verify commands does not directly get chained back up to the IteratorCommand, but indirectly through the use of the IteratorValidateCommand, which sits at the end of the iteration loop. A CompleteIterationCommand, which can be positioned prior to the IteratorValidateCommand, notifies the results framework that the given iteration has completed.

The iterator commands determine how an iteration progresses (e.g., incrementing a value over a range, searching in a binary fashion for stability, etc.). Iterator commands can have one or more properties, including for example:

A MinVal is typically used to define the bottom value of a range, used by iterators for which this value is applicable.

A MaxVal is typically used to define the top value of a range, used by iterators for which this value is applicable.

A PrevIterVerdict is used to inform the iterator command of the status of the previous iteration. This is never used in determining if the first pass of an iteration should occur, but is typically used to determine if subsequent iterations should occur.

A CurrVal is the current value that defines the iteration. For ObjectIteratorCommand, this may be interpreted in the iteration loop as the number of objects to create and used to create so many stream blocks.

Iteration indicates the iteration pass count (e.g., 1, 2, 3 . . . ), without regard to the value of CurrVal during each pass. This type of information can be found in the name of database files, indicating their order of creation, for example.

Iterations have a resolution with each pass to determine if the iteration process should continue or cease. There are two forms of validating an iteration, a generic form based upon IteratorValidateCommand and a use specific form demonstrated in IteratorValidateTrafficResultCommand.

The general form validation, IteratorValidateCommand does not require any parameters from the author. During execution, this command checks whether the most recent verdict during the iteration is pass or fail. If pass, the iterator's PrevIterVerdict is set to true; else set to false. True is generally interpreted as the iteration loop will continue (if the other requirements of the iterator are met); while false is interpreted as the iteration loop will end (regardless of any other iterator requirements). Note that other commands not directly related to the iteration framework, such as VerifyDbQueryComman, also form verdicts. A specialized form, IteratorValidateTrafficResultCommand, allows the author to look to specific traffic status to generate the verdict and then act upon it.

Modes

Iterators can implement a variety of modes, such as for example, a step search iterator, a binary search iterator, a list iterator, a range iterator and others and combinations thereof.

The step search type of iterator, such as example 1 described above, provides for iteration over a range by a step value until a max value is reached.

The binary search iterator, such as example 2 described above, provides for iteration starting midway between a min and a max values as the first iteration pass. Then based upon the results of each iteration will either search up or down half way closer to the corresponding limit, as would a binary search engine. An ObjectIteratorCommand, BenchmarkStabilityIteratorCommand, and RateIteratorCommand are examples of iterators that support binary search.

The list iterator, such as the example illustrated by FIG. 5B and described above, can include stepping through a list of values (indexing the list by a step value of 1). For example, one could iterate over a list of frame sizes, such as 128, 256, 512, and 1024 bytes for each pass of an iteration loop, and in the order that the values are found in the list. An ObjectIteratorCommand is an example of an iterator that supports iterating over a list of fixed values when appropriately configured. Note that the list of values could be strings and are not limited to numerical values.

The range iterators are iterators in which the step value (if not in binary search mode) can be any value within the range itself. Typically, the iteration will span the range from min to max (or max to min) and the step will be less than the difference between those two values.

The stability seeking iterators are designed to seek best, repeatable configuration settings by repeatedly reproducing the results of iterating through a series more than once. This is offered to ensure that the testing has been redundantly performed a sufficient number of times to give credibility and confidence in characterizing the limitations of the system under test. The StabilityBackoffIteratorCommand is designed to offer seeking of a stable configuration in which the traffic throughput maintains performance within specific margins. It will perform iteration within the range from max value to min value (backing off or down) to discover the highest ideal value, and repeat.

In an example of a backoff iterator command, a test harness conducts stress testing of a system under test. The test harness bounds a set of test commands implementing a stress test with transitory iterator command and a transitory iteration-verifier command. The transitory iterator and iteration-verifier commands are active when they are executed and are inactive when the bounded test commands are active. (Transitory commands are active during execution on the test harness, but inactive otherwise.)

A sequence of network traffic stress tests is performed. The stress tests include test commands that cause the test harness to send test traffic messages to the system under test via one or more network ports and measure performance of the system under test. For example, measuring frame dropping by a pass-through SUT, measuring command response by a SUT that responds to configuration commands during the test, measuring other metrics and combinations thereof can be conducted to determine performance. The transitory iterator and iteration-verifier commands combine to implement a stability backoff test of stress levels. For example, stability backoff tests of stress levels can be realized by testing through-put capacity, testing command processing capacity while under load, testing other system capacities and combinations thereof.

An example backoff stress test can begin in an expected failure range that is above an approximately measured pass/fail threshold. One method for beginning in an expected failure range that is above an approximately measured pass/fail threshold includes chaining a ramp-up test to determine the approximately measured pass/fail threshold. In another method, a binary search test determines the approximately measured pass/fail threshold. A still further method includes using a backoff resolution having a resolution at least ten times as precise as the approximately measured pass/fail threshold.

The transitory iterator command performs backing off an applied stress applied by the bounded test commands. In one implementation, the transitory iterator command employs parameter chaining to preserve a machine state, a test result, a variable of interest, a passed in parameter, other data items, or combinations thereof.

The applied stress is repeated a predetermined number of times, which is more than once for the applied stress level.

The iteration-verifier command evaluates a pass/fail result for the iteration of the applied stress level, and accumulates a pass/fail rate for results of iterations at the applied stress level.

The iteration-verifier command can evaluate the accumulated pass/fail rate, after the predetermined number of times iterating at the applied stress level, against a predetermined pass rate, and score the applied stress level as passed or failed. For example, iteration-verifier command can cause a query against databases collecting results of each iteration at the applied stress level and evaluate a pass/fail result for the iteration of the applied stress level from a response to the query.

The transitory iterator command terminates the test when the predetermined pass rate has been achieved at a predetermined number of applied stress levels as the transitory iterator progressively backs off the applied stress level. In an implementation, the transitory iterator progressively backs off the applied stress level using a specified backoff increment, however, other mechanisms for determining a backoff increment (e.g., computational, selected based upon sensed environmental factors, others or combinations thereof) can be used. One or more result commands outside the bounded test commands reporting test results.

In one implementation, the StabilityBackoffIteratorCommand can accept one or more properties specified by the test author to configure the stress testing. For example, authors can use properties to set one or more of an amount to step backwards to determine the next value in the iteration, a number of times to repeat the test value, a percentage of times a repeated test value must pass to be considered stable, a type that determines the finite set of values being iterated over (Acceptable values are: LIST or RANGE: LIST uses ValueList to define the finite set of values. RANGE uses MinVal, MaxVal, and StepVal to define the finite set of values), a list that defines a finite set of values being iterated over; used when ValueType is set to LIST, a current index number of ValueList; used when ValueType is LIST, a current smallest failing value seen during the iteration, a current largest passing value seen during the iteration, a number of successful trials for the current test value, a trial number for the current test value, a value the iterator determined to be stable, a flag indicating true when able to determine a stable value; and false when unable to determine a stable value, a flat indicating true will break out of the test or sequence when an iteration fails; indicating false will continue the test or sequence if an iteration fails, a minimum possible value to be used in an iteration, a maximum possible value to be used in an iteration, a result of the previous iteration, an index (1-based) of the current iteration, a value the configurator(s) can use in the current iteration, and a flag that when indicating true resets the state of the command and its properties; and when indicating false retains the state of the command and the values of its properties. Of course the foregoing is merely an illustrative example, and not all properties will be available in all implementations. Further, some implementations will have other and different properties than the ones indicated.

The BenchmarkStabilityIteratorCommand is designed to offer seeking of a stable configuration and will repeat also. This command provides iterating by means of binary and a more traditional/intuitive forward seeking (min to max) iteration modes.

In order to provide for iterating over traffic loads, the iteration loop can include an iterator that iterates across load values (range, binary, list, etc.) and a configurator that takes the iteration's current value and uses that to configure the traffic load for a collection of stream blocks. An IteratorConfigTrafficLoadCommand is provided for this purpose.

In order to provide for iterating over frame sizes, the iteration loop can include an iterator that iterates over a list of frame size values, and a configurator that takes the iteration value and uses that to configure the frame sizes for a collection of stream blocks. An IteratorConfigFrameSizeCommand is provided for this purpose.

An IteratorConfigRotateTrafficMixWeightsCommand is a special purpose command for use by the Access Control List Methodology. It assumes that a set of n stream blocks were created representing a first collection, and another set of n stream blocks were created representing a second collection. The traffic load weights of the first collection are greater than zero, whereas those of the second are initially set to zero. The rotation of the weights by m stream blocks essentially disables some stream blocks from the first collection by giving them weights of zero, while enabling others from the second collection by giving these weights other than zero. This allows for streams or flows matching some criteria to be pre-laced with other streams or flows that do not match the same criteria by having the latter rotate in place of the former.

FIG. 5C illustrates classes implementing an iterator in the non-procedural test sequence. As shown in FIG. 5C, ObjectIteratorCommand 576 and RateIteratorCommand 574 as subclasses inheriting from an IteratorCommand class 572. Following UML conventions, public elements of the IteratorCommand class 572 are breakOnFail, min, max and overwriteConfiguredRange. Private elements that are available within the class include iteration, minFail, maxPass and prevIterResult. Publically available outputs of the IteratorCommand class include currValue and iteration, as illustrated in the code example of FIG. 5B. The public output via the iteration element is the current index of processing iterations. For objects, it is the object index within an object list.

Public elements of ObjectIteratorCommand that can be specified to control iteration over objects include iterMode, step, valueType and valueList. In addition to iterating over objects, a RateIteratorCommand 574 (FIG. 5C) is provided that accepts a resolution and resolution mode for test control.

Figure 6A:
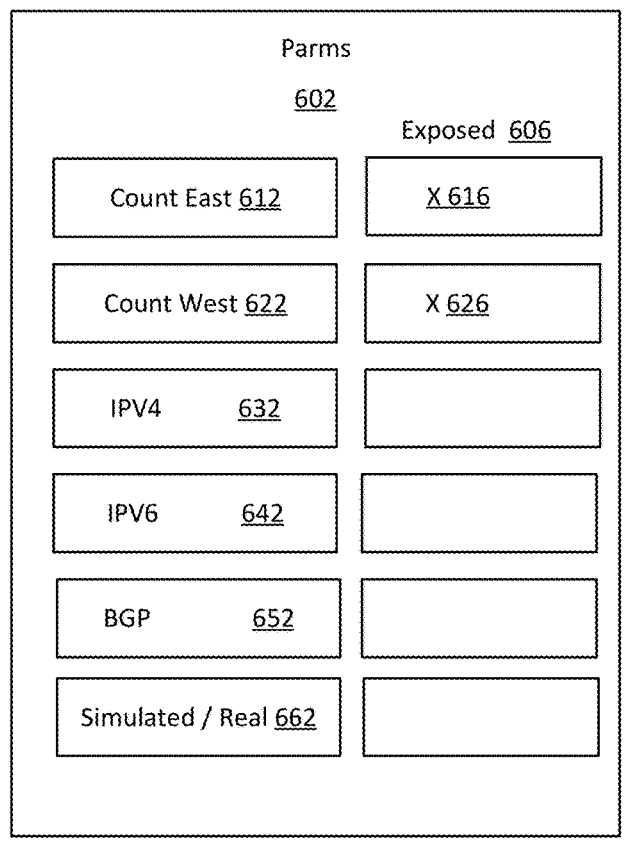
FIG. 6A illustrates test parameter data and exposed test parameters that control operation of a test.

FIG. 6A illustrates test parameter data and exposed test parameters that control operation of a test. As shown by FIG. 6A, numerous parameters 602 govern the operation and configuration of test processes in test environment 100. A subset of parameters 602 are exposed parameters, denoted in FIG. 6A by an "X" placed in an exposed column 606. Exposed parameters are parameters that are exposed to end users to facilitate limited modifications of test process function. Accordingly, in the example of FIG. 6A, parameters: Count East 612 and Count West 622 are exposed parameters as denoted by "X" 616, 626 placed in "Exposed" column 606. Remaining parameters IPV4 632, IPV6 642, BGP 652 and Simulated Real 662 are non-exposed parameters that lack an "X" in the exposed column. Because these parameters are not exposed to the user, the user is prevented from modifying these non-exposed parameters. Now with reference to FIGS. 6B-6C, an example of using exposed parameters to modify a test scenario will be described.

FIG. 6B illustrates excerpts from a JSON implementation of test parameter data and exposed test parameters. In the example discussed below with reference to FIG. 6B, a brief snippet of an approximately 10,000 line test sequence is used to illustrate modification of test behavior using exposed parameters. Now with reference to FIG. 6C, a brief snippet of a configuration parameter file is exposed to an end user where the end user can modify the list for instant runtime settings for a test. The short list of parameters exposed to the end user is a subset of the overall list of properties configured to run the test.

A test is authored by an expert in network device testing using tools and libraries to produce files containing the instructions and configuration settings to perform the test. In one implementation, these files include a sequencer.xml file. An example portion of a sequencer.xml file is illustrated by block 672 of FIG. 6B. Then, a subset of the configuration settings in the sequencer.xml file, such as the configuration of the number of emulated clients for a test, is presented to the end user for edits by exposing a parameter specifying the number of emulated hosts. For example, in a particular test, the default number of hosts generated for an IPV4 test is 1 as illustrated by EPDefaultValue='1' 673*a* in block 672 of FIG. 6B. This can be modified by the end user to generate any number of hosts for the test. Using this method, an author can create a test for an IPTV channel zapping test, and an end user can run the test multiple times, each time with a different number of emulated hosts, simply by changing the number of hosts generated from the default of 1 to the desired number of hosts.

In an implementation, this can be achieved by the end user changing an exposed parameter "copiesperparent" in a JSON file 674 (named "metadata.json" in one implementation) to hold a property_value of "4000" (675 of block 674 in FIG. 6C), the user's desired number of hosts to be generated. Accordingly, submitting the JSON file 674 of FIG. 6C along with the sequencer.xml file 672 of FIG. 6B to the test harness at runtime causes the parameter values in the JSON file 674 to take precedence over the corresponding values for parameters as listed in the sequencer.xml file 672, effectively overriding the default values of the test with the specific values input by the end user.

While application of modifications by a relatively lesser skilled end user to test configurations developed by an expertly skilled author in a controlled and "safe" manner, has been demonstrated by the foregoing example using JSON and XML formats, it will be appreciated that implementations can also employ other and different file formats, e.g., TXML, db, CSV, other file formats and combinations thereof, when implementing the functionality and features described.

In addition to the base commands and base topology templates, an API containing sequence commands such as iteration commands, start/stop commands, etc. are also available to the author. It is the sum of the selected base commands, base topology templates, and sequence commands that comprise a test methodology. In an IPTV channel zapping test, for instance, the properties for the test can number in the thousands. A subset of these properties is exposed to the end user as configurable properties. This subset can include the properties provided to declare the following: a number of IGMP/MLD hosts per host port (def: 4000), a number of multicast group blocks (def: 256), a number of addresses per multicast group block (def: 4), a number of iterations to run the channel changing, a wait time between joins and leaves, a join latency threshold, aleave latency threshold, and a stop on Fail.

The end user configurable parameters may further include a mapping pattern for channel changing, various information about the emulated devices, stream block, etc., and different types of protocol support. The end user configurable properties are also known as exposed parameters. In one example, the exposed parameters can be contained within a JSON file as a property_group, an XML file, or other file structure.

The JSON property_group is used to hold a collection of related properties. When the JSON for one or more methodologies is retrieved via one of the Get commands, the property_group delivers the information that describes every kind of property related to the test. This list of kinds includes but is not limited to: Test Settings, Test Criteria, Traffic Settings, and Subnet Settings. The ID of the property_group maps to a specific use by the client.

The JSON also can define property values. Each property_value_item contains the following: a prop_id that is a unique identifier for the property, a gui_id that identifies the GUI component that renders the property, a display_name friendly name for the property, a description of the property, an optional image URI for the property, a property_name, generally referring to the internal STC name, and a property_value, delivered as a string or a JSON array of strings. On a Get, the property_value is what was set by the test author. On a Run, the property_value is the localized value as specified by the client. The property_value_type that gives instruction as to how the string stored in the property_value is to be interpreted. The units, minimum, and maximum values for the property_ value, where applicable based on property_value_type. The readOnly flag, when present and set to true, causes the system to block editing of a property by the client. The acceptable_values array is used when property_value_type is set to something that receives a list of values, such as ENUM, List. This can be used by the client for rendering drop-down lists, checkbox lists, and so on.

In this example, the JSON data structure can contain the following:

```
Number of IGMP/MLD hosts per host port:
    {
        "display_name": "spirent.methodology.
        createtemplateconfigcommand.copiesperparent",
        "description": "",
        "gui_id": "",
        "property_value_type": "integer",
        "property_value": "4000",
        "prop_id": "spirent.methodology.
        createtemplateconfigcommand.copiesperparent.2995"
    },
Number of multicast group blocks: (blocks of channels)
    {
        "display_name": "spirent.methodology.
        createtemplateconfigcommand.copiesperparent",
        "description": "",
        "gui_id": "",
        "property_value_type": "integer",
        "property_value": "256",
        "prop_id": "spirent.methodology.
        createtemplateconfigcommand.copiesperparent.2997"
    },
Number of addresses per multicast group block:
    {
        "display_name": "spirent.methodology.
        createtemplateconfigcommand.inputjson",
        "description": "Ipv4NetworkBlock",
        "property_value_rows": [ ],
        "gui_id": "",
        "property_value_type": "string",
        "prop_json_id": "modifyList[0].
        propertyValueList[0].propertyValueList.NetworkCount",
        "property_value": "4",
        "prop_id": "spirent.methodology.
        createtemplateconfigcommand.inputjson.2997",
        "gui_only": true
    },
Number of iterations to run the channel changing
    {
        "display_name": "spirent.methodology.
        iteratorcommand.maxval",
        "description": "",
        "gui_id": "",
        "property_value_type": "float",
        "property_value": "10000.0",
```

```
        "prop_id": "spirent.methodology.
         objectiteratorcommand.maxval.3037"
    },
The multicast group starting address:
    {
        "display_name": "spirent.methodology.
         createtemplateconfigcommand.inputjson",
        "description": "Ipv4NetworkBlock StartIpList",
        "property_value_rows": [ ],
        "gui_id": "",
        "property_value_type": "string",
        "prop_json_id": "modifyList[1].
         stmPropertyModifierList[0].propertyValueList.Start",
        "property_value": "225.0.0.1",
        "prop_id": "spirent.methodology.
         createtemplateconfigcommand.inputjson.2997",
        "gui_only": true
    }, . . .
```

In the foregoing example implementation, only these five parameters, of the thousands of possible properties, are exposed to the end user for modification. At run time, the configurations for the five exposed parameters are used override the defaults for properties recorded in the sequencer.xml file.

Figure 7:
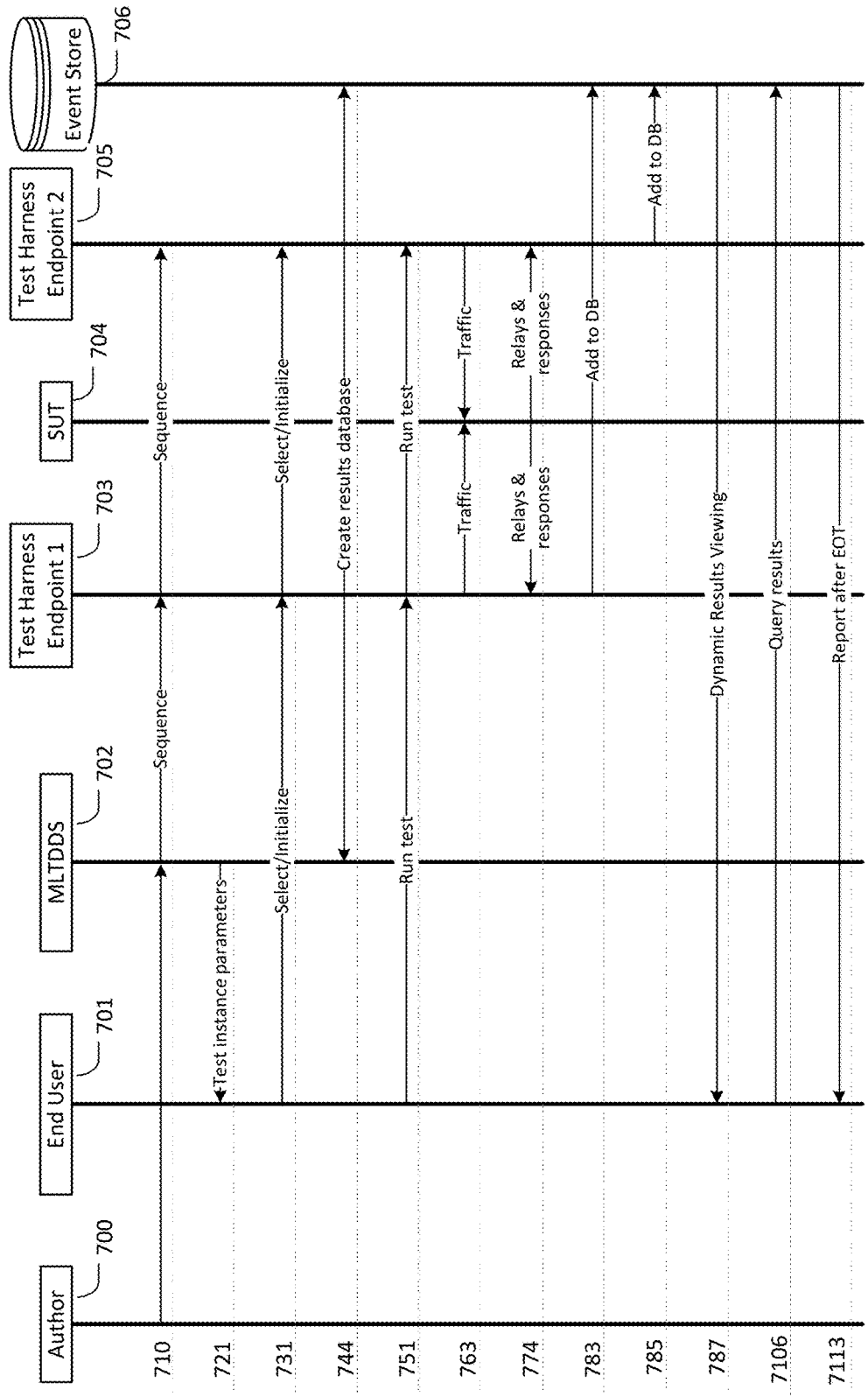
FIG. 7 illustrates simplified message flows involved in authoring, customizing, running and obtaining results from a network device test.

FIG. 7 illustrates simplified message exchanges involved in authoring, customizing, running and obtaining results from a network device test. Testing generally proceeds by creating, modifying, and initializing tests, shown by message exchanges 710-744, running tests, as shown in message exchanges 751-795, and examining results, depicted by message exchanges 7106-7113.

In a message exchange 710, authors 700 use a base object layer, comprising based templates and base commands, to create test methodologies, including command sequence and an auxiliary file (e.g., JSON or TXML files) and provide these methodologies to end users 701 as a multi-layered test definition data structure 702 that controls operation of the test harness 703, 705. In a message exchange 721, the end user 701 can access test instance parameters from the multi-layered test definition data structure 702 for purposes of modifying the test cases as desired. Certain parameters are exposed to end users to enable these end users to modify certain aspects of tests, while other parameters are not exposed, thereby ensuring that modifications related to these non-exposed parameters are not permitted. In a message exchange 731, the end user 701 can select test scenarios and initialize devices specified for the test at test harness endpoint 1 703 and at test harness endpoint 2 705 and the system under test 704. In a message exchange 744, a results database is created in event store 706 for the test.

In a message exchange 751, the end user 701 runs tests. During testing, devices are simulated to system under test 704 at test harness endpoint 1 703 and at test harness endpoint 2 705. In a message exchange 763, test traffic flows from test harness endpoint 1 703 and test harness endpoint 2 705 to the system under test 704. In a message exchange 774, system under test 704 relays the traffic and responds to test input. In message exchanges 783, 795, test results are added to the database created in the event store 706 and optionally provided to end user 701 by dynamic results viewing.

In a message exchange 7106 query results can be provided from database to test harness endpoint 1 703 and/or test harness endpoint 2 705. In a message exchange 7113, reports can be provided after end of testing by test processes at the test harness endpoint 1 703 and/or test harness endpoint 2 705.

Figure 8:
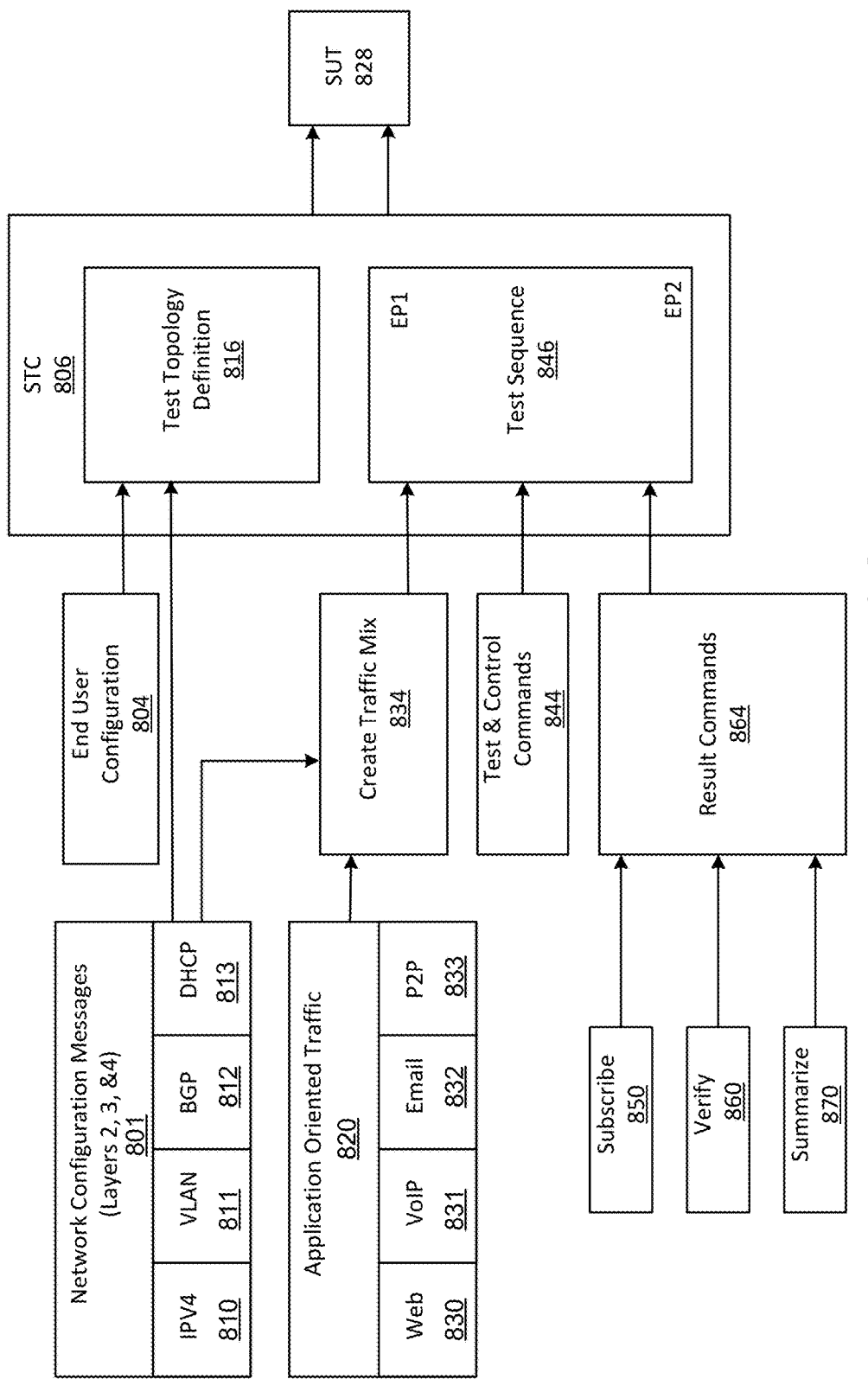
FIG. 8 illustrates flow among blocks.

FIG. 8 illustrates flow among blocks. As shown by FIG. 8, a Spirent Test Center 806 includes a test sequence 846 that applies traffic to a system under test 828 in order to conduct testing. The test topology definition 816 and the test sequence 846 are defined by authors, experts in designing and creating tests, as discussed in further detail below. The test sequence 846 applies traffic mix created by create traffic mix 834 from one or more application traffic profiles 820 and/or one or more network traffic profiles 801. Application traffic profiles are created by combining various combinations of application profiles 830, 831, 832, and 833. Network traffic profiles are created by combining various combinations of template configs 810, 811, 812, and 813.

For instance, if a client runs a web application 830 on a system that uses network protocols of the type IPv4 810 and DHCP 813, then the technology disclosed can be applied to generate a topology template that is specific to the client's application and network protocols.

Application oriented traffic 820 includes Application profiles that define traffic for specific applications such as web 830, VoIP 831, Email 832 or Point-to-Point (P2P) 833 applications. Application profiles can be defined and stored separately.

Network Configuration Messages 801 includes template configs that define network technologies such as IPv4 810, VLAN 811, BGP 812, DHCPv4 813, other network protocols such as Ethernet II, 802.3 Ethernet, LAN, SAN, WAN, IPv6 not shown in FIG. 8 for clarity sake, and combinations thereof template configs can also be defined and stored separately. Any specific instance of a template config comprises one or more instances of the network technologies.

In one implementation, a create traffic mix 834 enables combining selected ones of application oriented traffic 820, such as a web application profile 830 and an email application profile 832, for example, with selected ones of network configuration messages 801, such as IPv4 810 and BGP 812 to create traffic mix to be applied by the test sequence 846.

Network configuration messages 801 and end user configuration 804 can be combined to create a test topology definition 816. An end user would be able to make the described application and traffic combinations without a full understanding of the applications or network components.

Test and control commands 844 reference base templates and parameter files prepared by test authors when they create a traffic mix 834. The majority of parameters encapsulated in a test parameter configuration file are inaccessible to end users; they are exposed to highly trained test authors and not exposed to end users of the test system.

Result commands 864 specify information to be retrieved in-test and post-test from result collection databases. In some implementations, distributed in memory databases with dual interfaces implement in-test queries, used in dynamic result viewing (DRM), as well as post-test queries for summary reporting. A consumer of test results can subscribe 850 to one or more particular test databases. The subscription can specify the frequency of updating the information that the subscriber desires. A consumer can verify 860 content of a subscription, e.g., verify out of sequence thresholds, dropped packet thresholds, and others. A consumer can indicate what types of results the consumer would like to summarize 870 the data in the subscription.

An OpenFlow topology template implements forwarding rules using an open source, vendor agnostic specification now maintained by Open Networking Foundation. Alternatively, vendor specific rules could implemented, such as Cisco Unified Communications Manager technology. Layer 2-4 protocols can be implemented using the OpenFlow programmable protocol framework.

An East-West profile 295B of FIG. 2B describes networking within a data center that experiences heavy dataflows. This relatively new traffic architecture is intended to alleviate dataflow bottlenecks. New fast Ethernet connections between servers, such as application and database servers, can complicate analysis of dataflows and response times. Tests deployed using the building blocks described herein cover both traffic flow across Wide Area Networks (WANs) and within data centers (LANs, SANs).

Test Composition

Figure 9A:
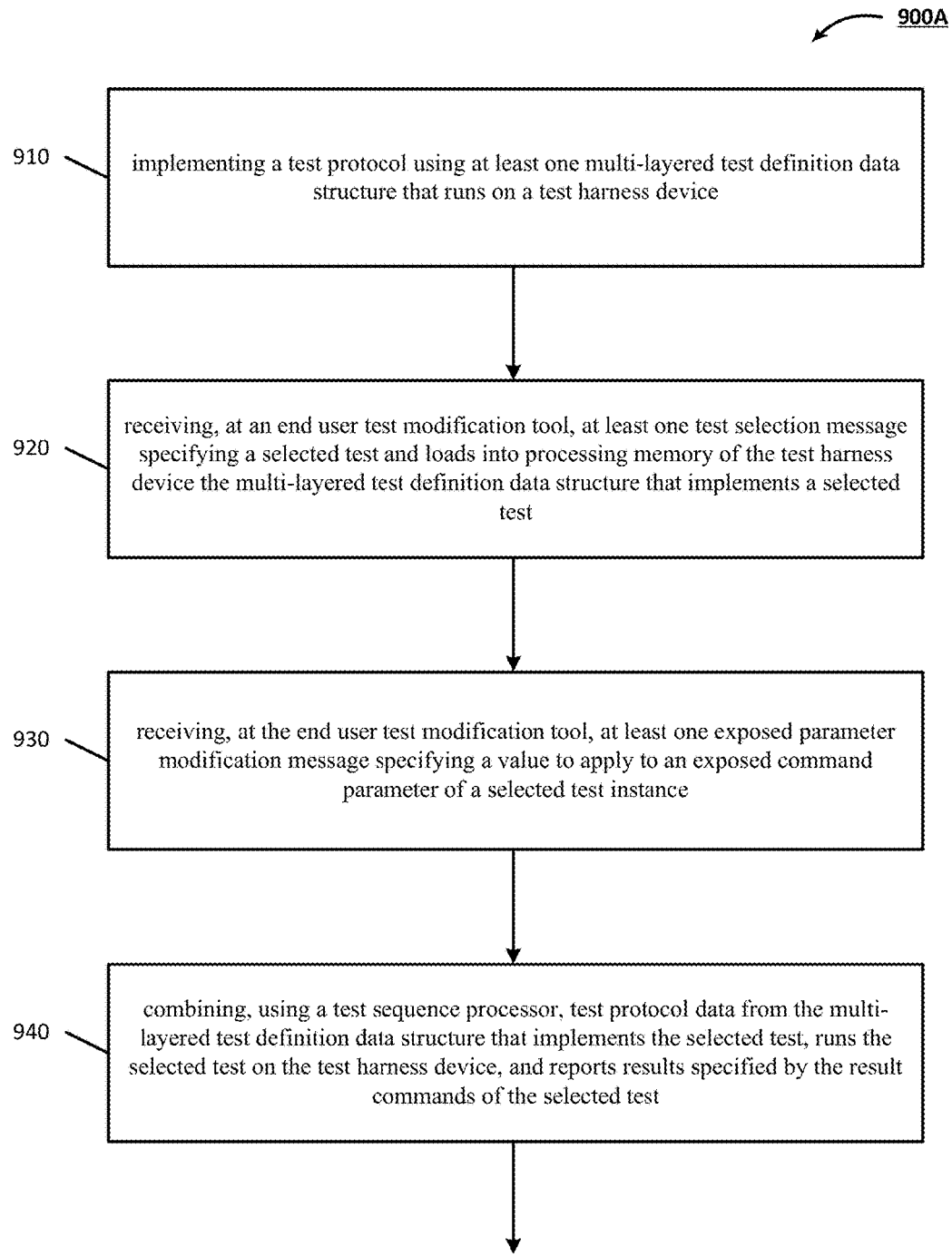
FIGS. 9A, 9B and 9C illustrate flow charts.
Figure 9B:
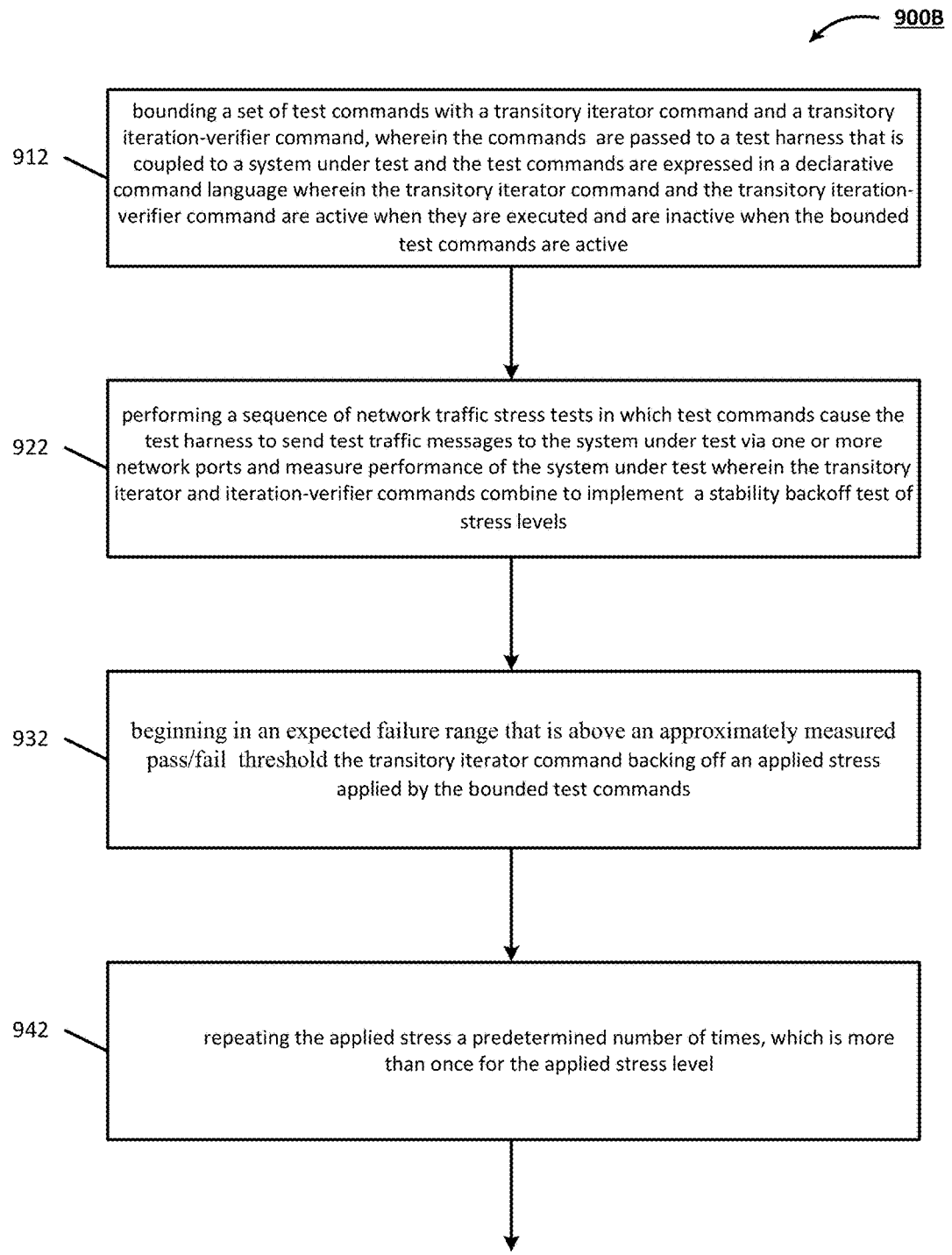

FIGS. 9A-9B illustrate flow charts. Defining test configurations of any complexity can be accomplished by programming variable arrays and iterating through the arrays directly in a test script. Or, it can also be accomplished using text files to store information such as the lists of values for each of the test variables, to be used by the test script at run-time. These methods, as well as others, presume a high level of domain knowledge.

FIG. 9A depicts flowchart 900A of a method for sending simulated input over network connections from simulated first and second endpoints to a system under test (SUT) in communication with a test generator system that monitors at a packet analysis level traffic received from the SUT.

In a block 910, a test protocol is implemented using at least one multi-layered test definition data structure that runs on a test harness device. Typically, the multi-layered test definition data structure includes: a base object layer including test processor configuration definitions that implement basic devices and protocols; a command sequencer object layer that incorporates devices and protocols from the base object layer and that defines a test in a series of command, including (a) topology commands that configure simulated first and second endpoint devices and protocols running on those devices, (b) one or more traffic commands that configure test traffic messages to send between the first and second endpoint devices, (c) test and control commands that implement test operations, including iteration over test operations, and (d) one or more result commands that specify result assembly for dynamic results reported during a test and after-test results reported after the test completes; command parameter data that specifies parameters of at least some of the commands (a)-(d); and exposed parameter modification data that an end user can modify to specify operation of a test instance, wherein the exposed parameter modification data is a subset of less than one quarter of the parameters in the command parameter data.

In a block 920, at least one test selection message is received, at an end user test modification tool, the message specifying a selected test and loads into processing memory of the test harness device the multi-layered test definition data structure that implements a selected test.

In a block 930, at least one exposed parameter modification message is received, at the end user test modification tool, the message specifying a value to apply to an exposed command parameter of a selected test instance.

In a block 940, test protocol data from the multi-layered test definition data structure that implements the selected test is combined using a test sequence processor, runs the selected test on the test harness device, and reports results specified by the result commands of the selected test.

Figure 9C:
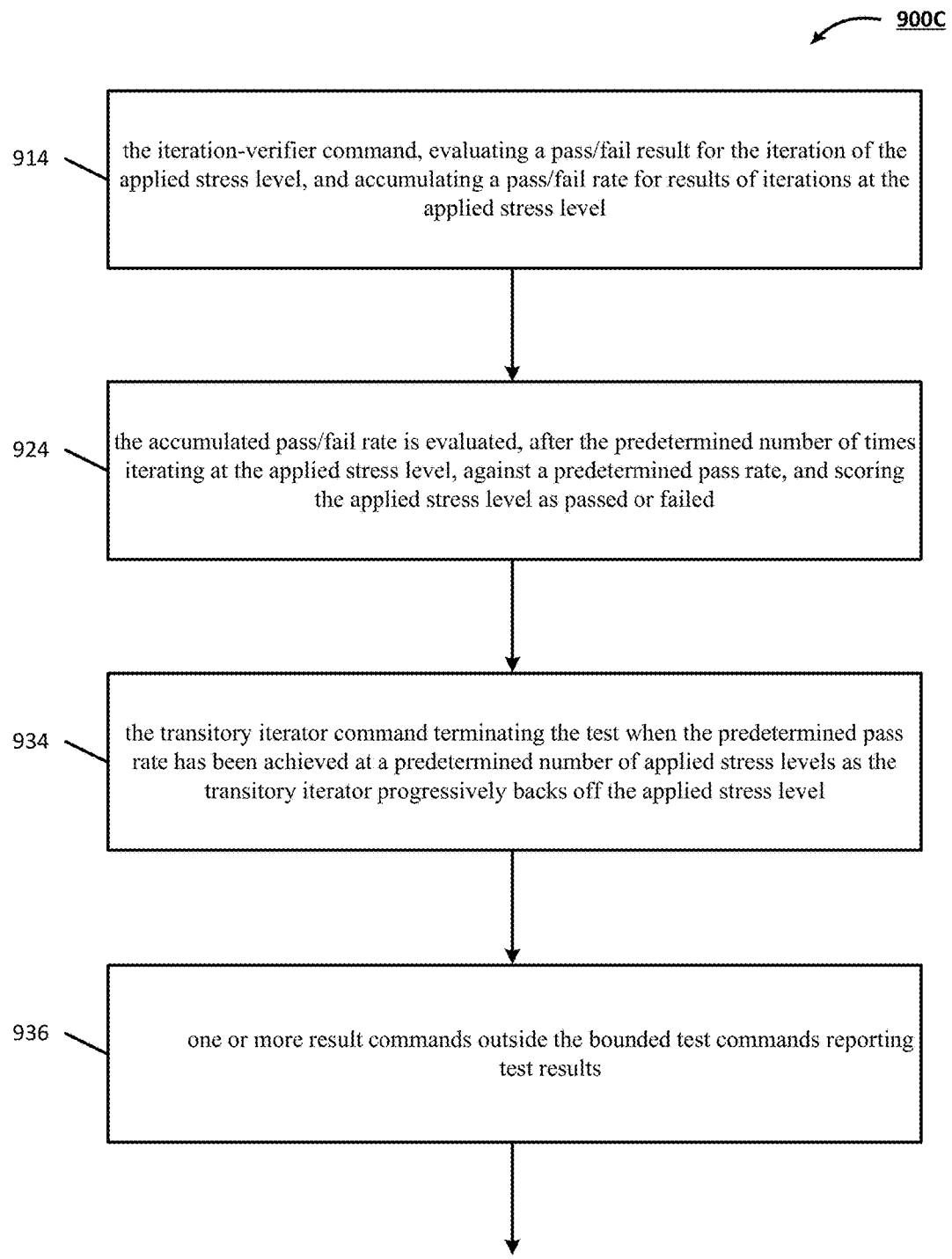

FIGS. 9B-9C depicts flowchart 900B of a method used by a test harness during a stress test of a system under test.

In a block 912, a set of test commands is bounded with a transitory iterator command and a transitory iteration-verifier command, wherein the commands are passed to a test harness that is coupled to a system under test and the test commands are expressed in a declarative command language. The transitory iterator command and the transitory iteration-verifier command are active when they are executed and are inactive when the bounded test commands are active.

In a block 922, a sequence of network traffic stress tests is performed in which test commands cause the test harness to send test traffic messages to the system under test via one or more network ports and measure performance of the system under test. The transitory iterator and iteration-verifier commands combine to implement a stability backoff test of stress levels.

In a block 932, beginning in an expected failure range that is above an approximately measured pass/fail threshold, the transitory iterator command backing off an applied stress applied by the bounded test commands.

In a block 942, repeating the applied stress a predetermined number of times, which is more than once for the applied stress level.

Now with reference to flowchart 900C in FIG. 9C.

In a block 914, the iteration-verifier command, evaluating a pass/fail result for the iteration of the applied stress level, and accumulating a pass/fail rate for results of iterations at the applied stress level.

In a block 924, the accumulated pass/fail rate is evaluated, after the predetermined number of times iterating at the applied stress level, against a predetermined pass rate, and scoring the applied stress level as passed or failed.

In a block 934, the transitory iterator command terminating the test when the predetermined pass rate has been achieved at a predetermined number of applied stress levels as the transitory iterator progressively backs off the applied stress level.

In a block 936, one or more result commands outside the bounded test commands reporting test results.

Figure 10:
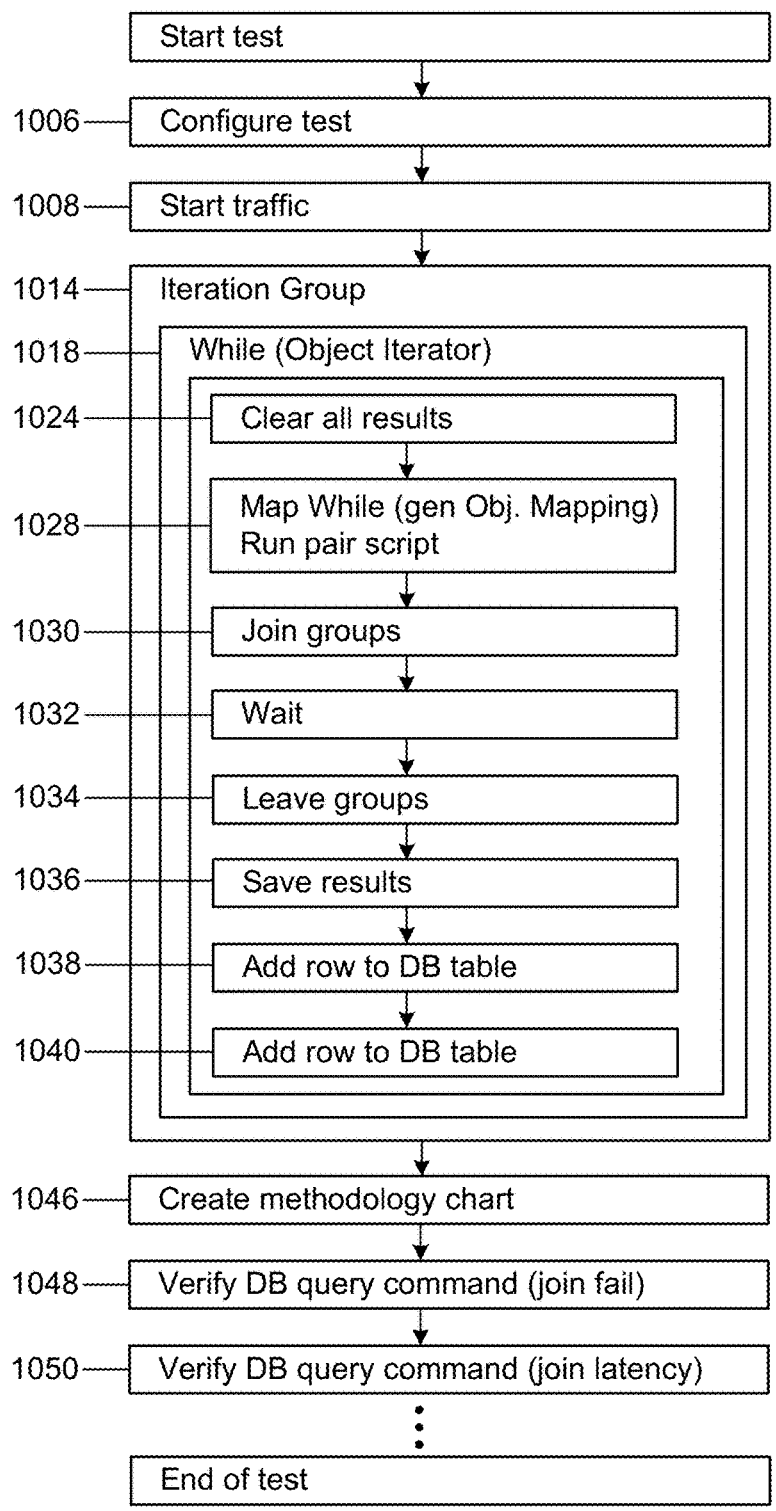
FIG. 10 illustrates an example of an end-to-end test for IPTV.

FIG. 10 illustrates the end-to-end processing for the IPTV test. In one implementation, the configured test 1006 is loaded, the process of which is described in further detail below with reference to FIG. 11. The test traffic is then started 1008 by execution of the StartOfTestCommand within the test group stc_testmethodology.xml command group, which initializes the test results interface.

An iteration group 1014 is then instantiated by the IterationGroupCommand, which chains the iterator, configurator, and validators under it. The iterator in this example is the while 1018 command. Result objects are first cleared 1024. Then, an embedded while loop 1028 pairs each defined object to a channel or group of channels. A MulticastJoinGroup command 1030 is then executed to join each defined host to a group of emulated channels. A wait period 1032 allows the signals to stabilize. Then a leave group command 1034 is executed via a MulticastLeaveGroupCommand. Once the object iterator 1018 has completed the join group 1030, wait 1032, and leave group 1034 commands, a save results command 1036 is then executed. This causes an add row to DB table command 1038 to be executed by the endpoint 1 210A, and another add row to DB table command 1040 to be executed by the endpoint 2 218B. In this example, the object iterator 1018 continues looping through steps 1024 through 1040 until it reaches the number of iterations required as defined in the JSON file.

Once the appropriate number of iterations has occurred within the iteration group 1014, the test harness then issues a command to create a methodology chart 1046 via the CreateMethodologyChart command. The VerifyDbQuery command 1048 verifies that the row count in the results database conforms to the specified criteria for join failures, and the VerifyDbQuery command 1050 verifies that the row count in the results database conforms to the specified criteria for join latencies.

Figure 11:
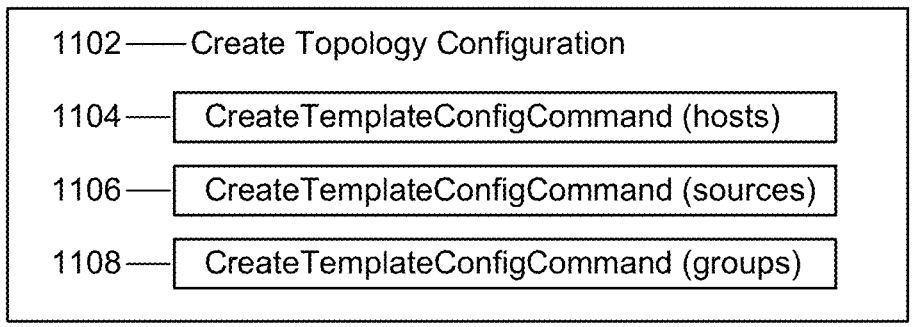
FIG. 11 illustrates a process to configure the end-to-end test for IPTV.
Figure 11:
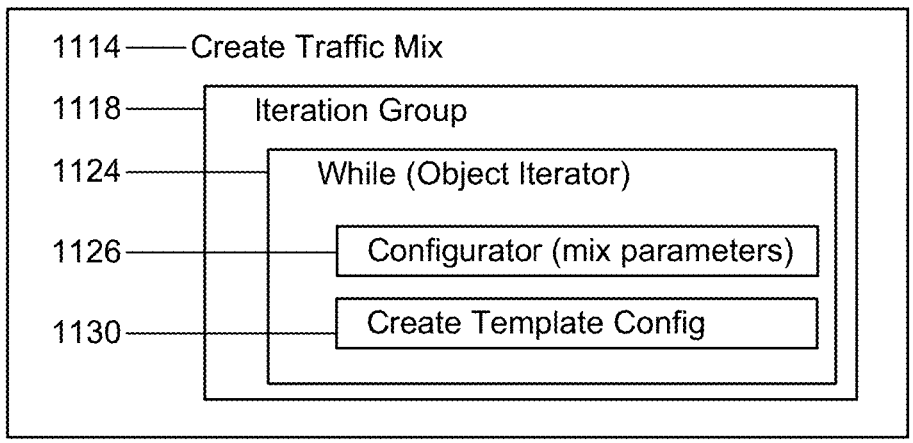
Figure 11:
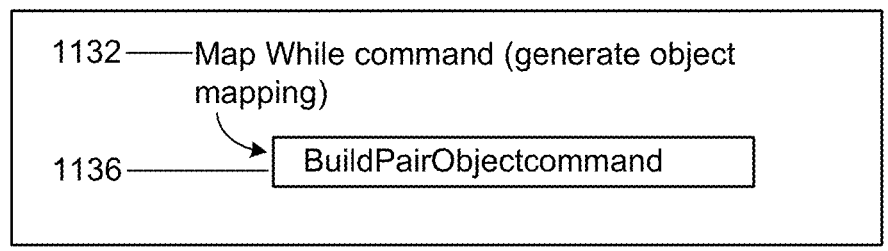

The configure test 1006 phase in the flowchart 1000 is expanded for illustration as FIG. 11. The configure test 1006 phase includes a create topology configuration 1102 group, and a create traffic mix 1114 group. The create topology configuration 1102 group includes creating a template configuration for hosts 1104, a template configuration for sources 1106, and a template configuration for groups 1108. The template configuration for hosts 1104 includes the hosts that are to emulate Set Top Boxes (STB) to be uses in the IPTV test. The template of sources 1106 are the emulations of video sources. And the template for group 1108 is for the plurality of channel groups to which each host will attach during the IPTV test.

The create traffic mix 1114 group includes an iteration group 1118, which iterates 1124 through a configurator 1126 that is derived from the base command IteratorConfigCommand, and through a process known as create template config 1130. In this example, create template config 1130 is where the emulated IGMP hosts send the IGMP Join message to being receiving multicast, or channel, data for the requested multicast groups.

The MapWhile command 1132 is the amount of time the emulated IGMP hosts will receive the multicast data. This is equivalent to how long a person is watching a channel, or set of channels. The BuildPairObjectcommand 1136 saves standard STC results, including configuration objects, to a database. The 'add row to DB table' 1038 and 1040 commands can then build custom tables with test specific data to the same database.

The technology disclosed includes a method for using special iterative group commands. These group commands are well-suited to testing because they can iterate directly over values of properties or objects. These commands also make use of property chaining to transfer the outputs of commands that are internal to the group command to be used as inputs to the group-level iteration command. This will greatly simplify the configuration and execution of complex application and network test scripts.

DESCRIPTION

While the technology disclosed has been described by way of example and in terms of specific implementations, it is to be understood that the technology disclosed is not limited to the disclosed implementations. To the contrary, it is intended to cover various modifications and similar arrangements as would be apparent to those skilled in the art. Therefore, the scope of the appended claims should be accorded the broadest interpretation so as to encompass such modifications and similar arrangements.

Particular Implementations

In one implementation, a method includes a test harness during a stress test of a system under test, including bounding a set of test commands with a transitory iterator command and a transitory iteration-verifier command, wherein the commands are passed to a test harness that is coupled to a system under test and the test commands are expressed in a declarative command language, and wherein the transitory iterator command and the transitory iteration-verifier command are active when they are executed and are inactive when the bounded test commands are active. The method also includes performing a sequence of network traffic stress tests in which test commands cause the test harness to send test traffic messages to the system under test via one or more network ports and measure performance of the system under test, wherein the transitory iterator and iteration-verifier commands combine to implement a stability backoff test of stress levels. The method also includes beginning in an expected failure range that is above an approximately measured pass/fail threshold, the transitory iterator command backing off an applied stress applied by the bounded test commands. The method also includes repeating the applied stress a predetermined number of times, which is more than once for the applied stress level, the iteration-verifier command, evaluating a pass/fail result for the iteration of the applied stress level, and accumulating a pass/fail rate for results of iterations at the applied stress level. The method also includes evaluating the accumulated pass/fail rate, after the predetermined number of times iterating at the applied stress level, against a predetermined pass rate, and scoring the applied stress level as passed or failed. Also included is the transitory iterator command terminating the test when the predetermined pass rate has been achieved at a predetermined number of applied stress levels as the transitory iterator progressively backs off the applied stress level, and one or more result commands outside the bounded test commands reporting test results.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations impacting details of test implementation and analysis and of setting thresholds based on test results.

The test harness, when expressing test commands in a declarative command language, includes an end user modifying exposed data to control test process behavior, and wherein transitory commands are active during execution on the test harness.

In one implementation, the transitory commands are inactive when not being executed on the test harness, and measuring performance of the system under test includes measuring frame dropping by a pass-through SUT. It can also include measuring performance of the system under test including measuring command response by a SUT that responds to configuration commands during the test.

In one example, the method includes implementing a stability backoff test of stress levels includes testing through-put capacity, and testing command processing capacity while under load.

The method can also include beginning in an expected failure range that is above an approximately measured pass/fail threshold includes chaining ramp-up test determining the approximately measured pass/fail threshold. It can also include a binary search test determining the approximately measured pass/fail threshold.

The method can also include beginning in an expected failure range that is above an approximately measured pass/fail threshold includes backoff resolution has a resolution at least ten times as precise as the approximately measured pass/fail threshold, and wherein the transitory iterator command backing off an applied stress applied by the bounded test commands includes parameter chaining.

In one implementation, the method includes the iteration-verifier command causing a query against databases collecting results of each iteration at the applied stress level.

The method can also include the iteration-verifier command evaluates a pass/fail result for the iteration of the applied stress level from a response to the query.

The method can also include the transitory iterator progressively backs off the applied stress level using a specified backoff increment.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations impacting details of test implementation and analysis and of setting thresholds based on test results.

Other implementations can include a test system for conducting stress testing of a system under test, including, a test harness coupleable to the system under test, and a test sequence processor that bounds a set of test commands with a transitory iterator command and a transitory iteration-verifier command, wherein the commands are passed to a test harness that is coupled to a system under test and the test commands are expressed in a declarative command language.

The implementation can also include the transitory iterator command and the transitory iteration-verifier command are active when they are executed and are inactive when the bounded test commands are active, and that perform a sequence of network traffic stress tests in which test commands cause the test harness to send test traffic messages to the system under test via one or more network ports and measure performance of the system under test.

The implementation can also include the transitory iterator and iteration-verifier commands combining to implement a stability backoff test of stress levels, wherein it begins in an expected failure range that is above an approximately measured pass/fail threshold, and the transitory iterator command backing off an applied stress applied by the bounded test commands. This can repeat the applied stress a predetermined number of times, which is more than once for the applied stress level, using the iteration-verifier command, evaluating a pass/fail result for the iteration of the applied stress level, and accumulating a pass/fail rate for results of iterations at the applied stress level. The implementation can also evaluate the accumulated pass/fail rate, after the predetermined number of times iterating at the applied stress level, against a predetermined pass rate, and scoring the applied stress level as passed or failed. The implementation also includes the transitory iterator command terminating the test when the predetermined pass rate has been achieved at a predetermined number of applied stress levels as the transitory iterator progressively backs off the applied stress level, and one or more result commands outside the bounded test commands reporting test results.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations impacting details of test implementation and analysis and of setting thresholds based on test results.

Other implementations can include a tangible non-volatile computer readable medium that stores computer instructions that, when run on hardware, implement a stress test of a system under test, the implementation including bounding a set of test commands with a transitory iterator command and a transitory iteration-verifier command, wherein the commands are passed to a test harness that is coupled to a system under test and the test commands are expressed in a declarative command language, and wherein the transitory iterator command and the transitory iteration-verifier command are active when they are executed and are inactive when the bounded test commands are active. The implementation can also include performing a sequence of network traffic stress tests in which test commands cause the test harness to send test traffic messages to the system under test via one or more network ports and measure performance of the system under test, wherein the transitory iterator and iteration-verifier commands combine to implement a stability backoff test of stress levels. This example can include beginning in an expected failure range that is above an approximately measured pass/fail threshold, the transitory iterator command backing off an applied stress applied by the bounded test commands, and repeating the applied stress a predetermined number of times, which is more than once for the applied stress level. The implementation can also include the iteration-verifier command, evaluating a pass/fail result for the iteration of the applied stress level, and accumulating a pass/fail rate for results of iterations at the applied stress level, and evaluating the accumulated pass/fail rate, after the predetermined number of times iterating at the applied stress level, against a predetermined pass rate, and scoring the applied stress level as passed or failed. The implementation can also include the transitory iterator command terminating the test when the predetermined pass rate has been achieved at a predetermined number of applied stress levels as the transitory iterator progressively backs off the applied stress level, and one or more result commands outside the bounded test commands reporting test results.

What is claimed is:

1. A method used by a test harness during a stress test of a system under test, including:
   bounding a set of test commands with a transitory iterator command and a transitory iteration-verifier command, wherein test commands are passed to a test harness that is coupled to a system under test and the test commands are expressed in a declarative command language;
   wherein the transitory iterator command and the transitory iteration-verifier command are active when they are executed and are inactive when the bounded test commands are active;
   performing a sequence of network traffic stress tests in which test commands cause the test harness to send test traffic messages to the system under test via one or more network ports and measure performance of the system under test;
   wherein the transitory iterator command and iteration-verifier command combine to implement a stability backoff test of stress levels;
   beginning in an expected failure range that is above an approximately measured pass/fail threshold;
   the transitory iterator command backing off an applied stress applied at an applied stress level by the bounded test commands;
   repeating the applied stress a predetermined number of times, which is more than once for the applied stress level;

the iteration-verifier command, evaluating a pass/fail result for an iteration of the applied stress level, and accumulating a pass/fail rate for results of iterations at the applied stress level; and evaluating the pass/fail rate accumulated, after the predetermined number of times iterating at the applied stress level, against a predetermined pass rate, and scoring the applied stress level as passed or failed;

the transitory iterator command terminating the test when the predetermined pass rate has been achieved at a predetermined number of applied stress levels as the transitory iterator command progressively backs off the applied stress level; and one or more result commands outside the bounded test commands reporting test results.

2. The method of claim 1, wherein expressing test commands in a declarative command language, includes an end user modifying exposed data to control test process behavior.

3. The method of claim 1, wherein transitory commands are active during execution on the test harness.

4. The method of claim 1, wherein transitory commands are inactive when not being executed on the test harness.

5. The method of claim 1, wherein measuring performance of the system under test includes measuring frame dropping by a pass-through SUT.

6. The method of claim 1, wherein measuring performance of the system under test includes measuring command response by a SUT that responds to configuration commands during the test.

7. The method of claim 1, wherein implementing a stability backoff test of stress levels includes testing through-put capacity.

8. The method of claim 1, wherein implementing a stability backoff test of stress levels includes testing command processing capacity while under load.

9. The method of claim 1, wherein beginning in an expected failure range that is above an approximately measured pass/fail threshold includes chaining ramp-up test determining the approximately measured pass/fail threshold.

10. The method of claim 1, wherein beginning in an expected failure range that is above an approximately measured pass/fail threshold includes binary search test determining the approximately measured pass/fail threshold.

11. The method of claim 1, wherein beginning in an expected failure range that is above an approximately measured pass/fail threshold includes backoff resolution has a resolution at least ten times as precise as the approximately measured pass/fail threshold.

12. The method of claim 1, wherein the transitory iterator command backing off an applied stress applied by the bounded test commands includes parameter chaining.

13. The method of claim 1, including the iteration-verifier command causing a query against databases collecting results of each iteration at the applied stress level.

14. The method of claim 13, wherein the iteration-verifier command evaluates a pass/fail result for an iteration of the applied stress level from a response to the query.

15. The method of claim 1, wherein the transitory iterator command progressively backs off the applied stress level using a specified backoff increment.

16. A test system for conducting stress testing of a system under test, including:

A test harness coupleable to the system under test; and

A test sequence processor that:

bounds a set of test commands with a transitory iterator command and a transitory iteration-verifier command, wherein test commands are passed to a test harness that is coupled to a system under test and the test commands are expressed in a declarative command language;

wherein the transitory iterator command and the transitory iteration-verifier command are active when they are executed and are inactive when the bounded test commands are active;

performs a sequence of network traffic stress tests in which test commands cause the test harness to send test traffic messages to the system under test via one or more network ports and measure performance of the system under test;

wherein the transitory iterator command and iteration-verifier command combine to implement a stability backoff test of stress levels;

begins in an expected failure range that is above an approximately measured pass/fail threshold;

the transitory iterator command backing off an applied stress applied at an applied stress level by the bounded test commands;

repeats the applied stress a predetermined number of times, which is more than once for the applied stress level;

the iteration-verifier command, evaluating a pass/fail result for an iteration of the applied stress level, and accumulating a pass/fail rate for results of iterations at the applied stress level; and evaluates the pass/fail rate accumulated, after the predetermined number of times iterating at the applied stress level, against a predetermined pass rate, and scoring the applied stress level as passed or failed;

the transitory iterator command terminating the test when the predetermined pass rate has been achieved at a predetermined number of applied stress levels as the transitory iterator command progressively backs off the applied stress level; and one or more result commands outside the bounded test commands reporting test results.

17. A tangible non-volatile computer readable medium that stores computer instructions that, when run on hardware, implement a stress test of a system under test, which instructions implement actions including:

bounding a set of test commands with a transitory iterator command and a transitory iteration-verifier command, wherein test commands are passed to a test harness that is coupled to a system under test and the test commands are expressed in a declarative command language;

wherein the transitory iterator command and the transitory iteration-verifier command are active when they are executed and are inactive when the bounded test commands are active;

performing a sequence of network traffic stress tests in which test commands cause the test harness to send test traffic messages to the system under test via one or more network ports and measure performance of the system under test;

wherein the transitory iterator command and iteration-verifier command combine to implement a stability backoff test of stress levels;

beginning in an expected failure range that is above an approximately measured pass/fail threshold;

the transitory iterator command backing off an applied stress applied at an applied stress level by the bounded test commands;

repeating the applied stress a predetermined number of times, which is more than once for the applied stress level;

the iteration-verifier command, evaluating a pass/fail result for an iteration of the applied stress level, and accumulating a pass/fail rate for results of iterations at the applied stress level; and evaluating the pass/fail rate accumulated, after the predetermined number of times iterating at the applied stress level, against a predetermined pass rate, and scoring the applied stress level as passed or failed;

the transitory iterator command terminating the test when the predetermined pass rate has been achieved at a predetermined number of applied stress levels as the transitory iterator command progressively backs off the applied stress level; and one or more result commands outside the bounded test commands reporting test results.

* * * * *